US012610947B2

(12) United States Patent
Bernard

(10) Patent No.: US 12,610,947 B2
(45) Date of Patent: Apr. 28, 2026

(54) TOBACCO AXILLARY BUD GROWTH INHIBITORS AND METHODS OF INHIBITING GROWTH OF TOBACCO AXILLARY BUDS

(71) Applicant: Drexel Chemical Company, Memphis, TN (US)

(72) Inventor: Milton Stanley Bernard, Rossville, TN (US)

(73) Assignee: Drexel Chemical Company, Memphis, TN (US)

( * ) Notice: Subject to any disclaimer, the term of this patent is extended or adjusted under 35 U.S.C. 154(b) by 184 days.

(21) Appl. No.: 17/214,376

(22) Filed: Mar. 26, 2021

(65) Prior Publication Data

US 2021/0307323 A1 Oct. 7, 2021

Related U.S. Application Data

(60) Provisional application No. 63/000,291, filed on Mar. 26, 2020.

(51) Int. Cl.
*A01N 31/02* (2006.01)

(52) U.S. Cl.
CPC .................................... *A01N 31/02* (2013.01)

(58) Field of Classification Search
CPC ................................ A01N 31/02; A01N 49/00
See application file for complete search history.

(56) References Cited

U.S. PATENT DOCUMENTS

| | | | | |
|---|---|---|---|---|
| 8,865,624 B2 * | 10/2014 | Tanaka | A01N 43/20 504/184 |
| 9,028,856 B2 * | 5/2015 | Reid | A01N 37/42 424/405 |
| 9,029,293 B2 * | 5/2015 | Tanaka | A01N 43/78 514/342 |
| 9,686,983 B2 * | 6/2017 | Tanaka | A01N 31/02 |
| 2019/0166831 A1 * | 6/2019 | Van Pottelberge | A01N 37/02 |

FOREIGN PATENT DOCUMENTS

WO WO-2013098934 A1 * 7/2013 ............. A01N 31/02

OTHER PUBLICATIONS

G. L. Steffens, T. C. Tso, and D. W. Spaulding, "Fatty Alcohol Inhibition of Tobacco Axillary and Terminal Bud Growth", Journal of Agricultural and Food Chemistry, vol. 15, No. 6, Nov.- Dec. 1967, 972-975. (Year: 1967).*

USDA, "Fatty Alcohols (Octanol and Decanol) Crops", Technical Evaluation Report, 2016, 1-16. (Year: 2016).*

WO 2013/098934 A1 machine translation (Year: 2013).*

Aakanksha Wany, Ashutosh Kumar, Sivaramaiah Nallapeta, Shivesh Jha, Vinod K. Nigam and Dev Mani Pandey, "Extraction and characterization of essential oil components based on geraniol and citronellol from Java citronella (*Cymbopogon winterianus Jowitt*)", Plant Growth Regulation (2014) 73:133-145 (Year: 2014).*

* cited by examiner

*Primary Examiner* — Mina Haghighatian
*Assistant Examiner* — Nathan W Schlientz
(74) *Attorney, Agent, or Firm* — Finnegan, Henderson, Farabow, Garrett & Dunner LLP

(57) ABSTRACT

Compositions and methods are disclosed for inhibiting axillary bud growth of a tobacco plant. For example, a composition comprising a naturally occurring C10 alcohol Is applied on a tobacco plant to inhibit axillary bud growth of the plant.

18 Claims, 8 Drawing Sheets

TOBACCO AXILLARY BUD GROWTH INHIBITORS AND METHODS OF INHIBITING GROWTH OF TOBACCO AXILLARY BUDS

This application claims priority to U.S. Provisional Application No. 63/000,291, filed Mar. 26, 2020; the content of this application is incorporated herein by reference in its entirety.

Tobacco axillary bud growth inhibition is critical to farmers as it can affect the quality and yield of the tobacco harvested. A marketable part of a tobacco plant is the leaves. Farmers desire large high-quality leaves in order to achieve higher yields and value. The size and number of leaves on a tobacco plant may be controlled in order to promote the growth of large leaves for harvesting and sale. During the development of a tobacco plant, buds tend to form near leaf axils. These axillary buds (often referred to in the industry as "suckers") may have the potential to form either vegetative or reproductive shoots. Such buds and shoots divert nutrients from the other parts of the plant, including the leaves, often resulting in smaller and/or lower quality leaves. Therefore, a goal of farmers is to inhibit, retard, suppress or stop the growth of axillary buds (referred to in the industry as "suckering") in order to achieve larger and higher quality leaves for harvesting and sale.

Several methods for inhibiting the growth of axillary buds have been developed. For example, farmers may manually remove the axillary buds or apply one or more chemicals (referred to in the industry as "suckercides") in order to kill and/or prevent the formation and/or growth of axillary buds. Manual removal is generally undesirable as a primary means of sucker control as it is extremely labor intensive. For this reason, most modern farmers turn to suckercides to control the growth of axillary buds. These suckercides are typically divided into three categories: contacts, contact systemics, and systemics. The effective use of chemical axillary bud inhibitors is desirable in order to increase product quality and yield.

The contact axillary bud inhibitors are typically synthetic fatty alcohols such as n-decanol. Those fatty alcohols effectively turn the sucker buds brown and then they fall of the tobacco plant. With the use of synthetic chemicals, there are certain drawbacks to the environment and consuming public. As such, there is a need to develop a naturally occurring (e.g., organic) basic or general axillary bud inhibitor.

Accordingly, the present disclosure provides for, among other things, compositions of an organic axillary bud inhibitor and methods that may result in one or more of the following: death of axillary buds or shoots, removal of axillary buds or shoots, and inhibition of axillary bud or shoot growth or development.

Disclosed herein are compositions and methods for inhibiting axillary bud growth based on the inventor's discovery that a composition comprising a naturally occurring C10 alcohol, when applied on a tobacco plant, may increase crop quality and yield, for example, by inhibiting the growth of axillary buds and shoots of the tobacco plant.

DESCRIPTION

Figure 1:
FIG. 1 shows leaves treated with fatty alcohol+pelargonic acid (treatment 5 at Farm B in Example 4 discussed below) with phytotoxicity stains.
Figure 2:
FIG. 2 shows an untreated control plant (from Farm A in Example 4 discussed below) with multiple shoots within 7 days from when the first axillary bud were observed (i.e., "sprouting").
Figure 3:
FIG. 3 shows a plant treated with fatty alcohol (treatment 6 at Farm A in Example 4 below) with budding shoots after first application, prompting a second application within 15 days of sprouting.
Figure 4:
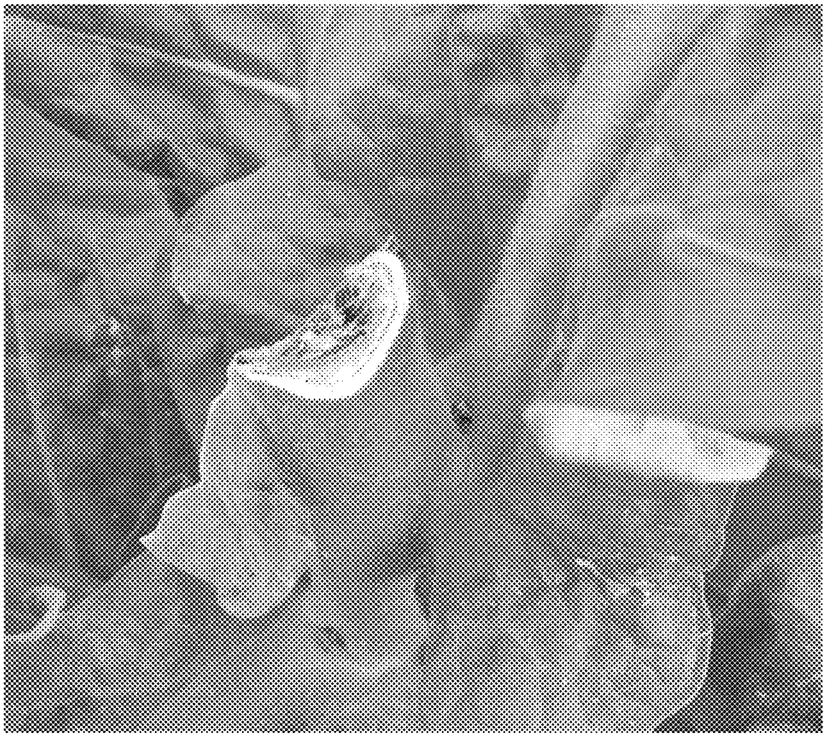
FIG. 4 shows a plant treated with BIOSUCKER (at Farm A in Example 4 below) without budding shoots, 27 days after sprouting.
Figure 5:
FIG. 5 shows a plant treated with BIOANTAK (at Farm A in Example 4 below) without budding shoots, 27 days after sprouting.
Figure 6:
FIG. 6 shows a plant treated with the standard treatment of fatty alcohol+pendimethalin (at Farm B in Example 4 below).
Figure 7:
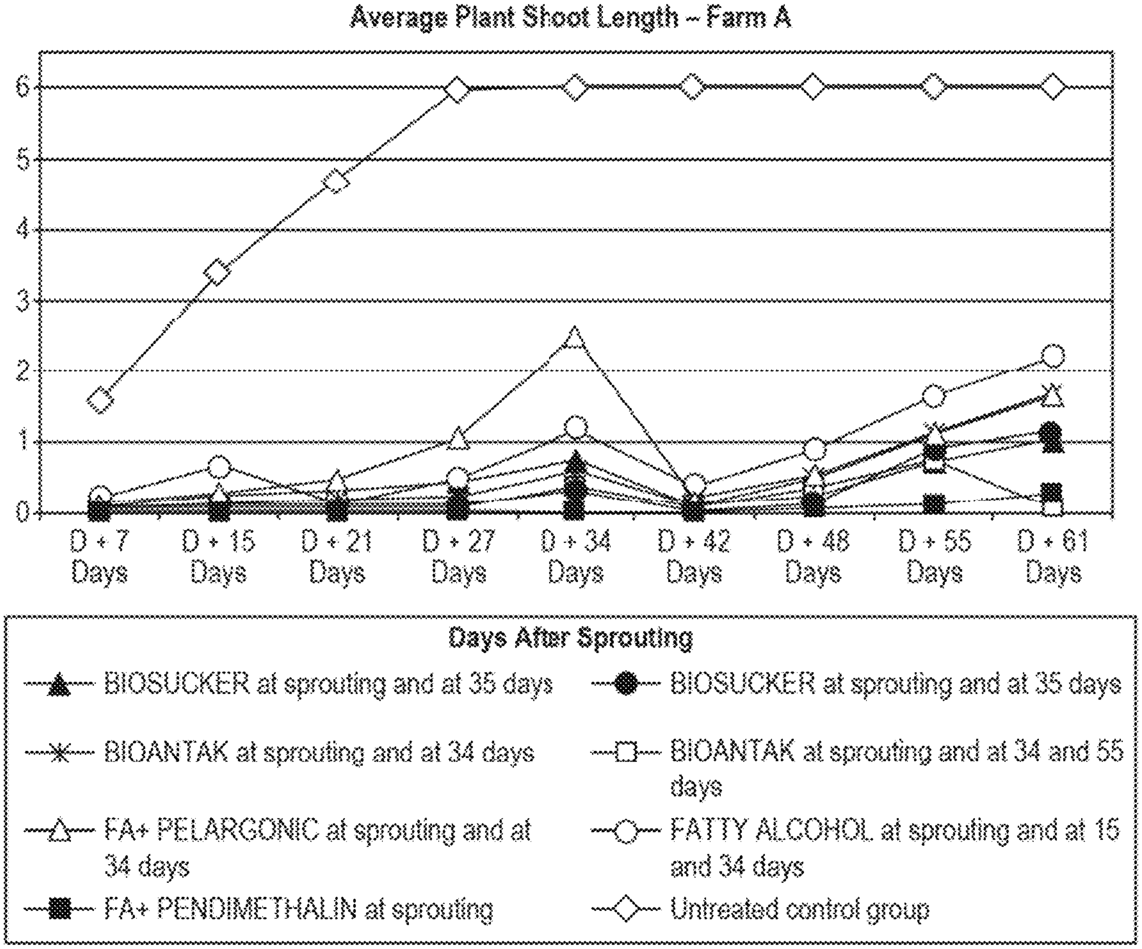
FIG. 7 shows the results of a study at Farm A (Example 4) comparing the effectiveness of various treatments.
Figure 8:
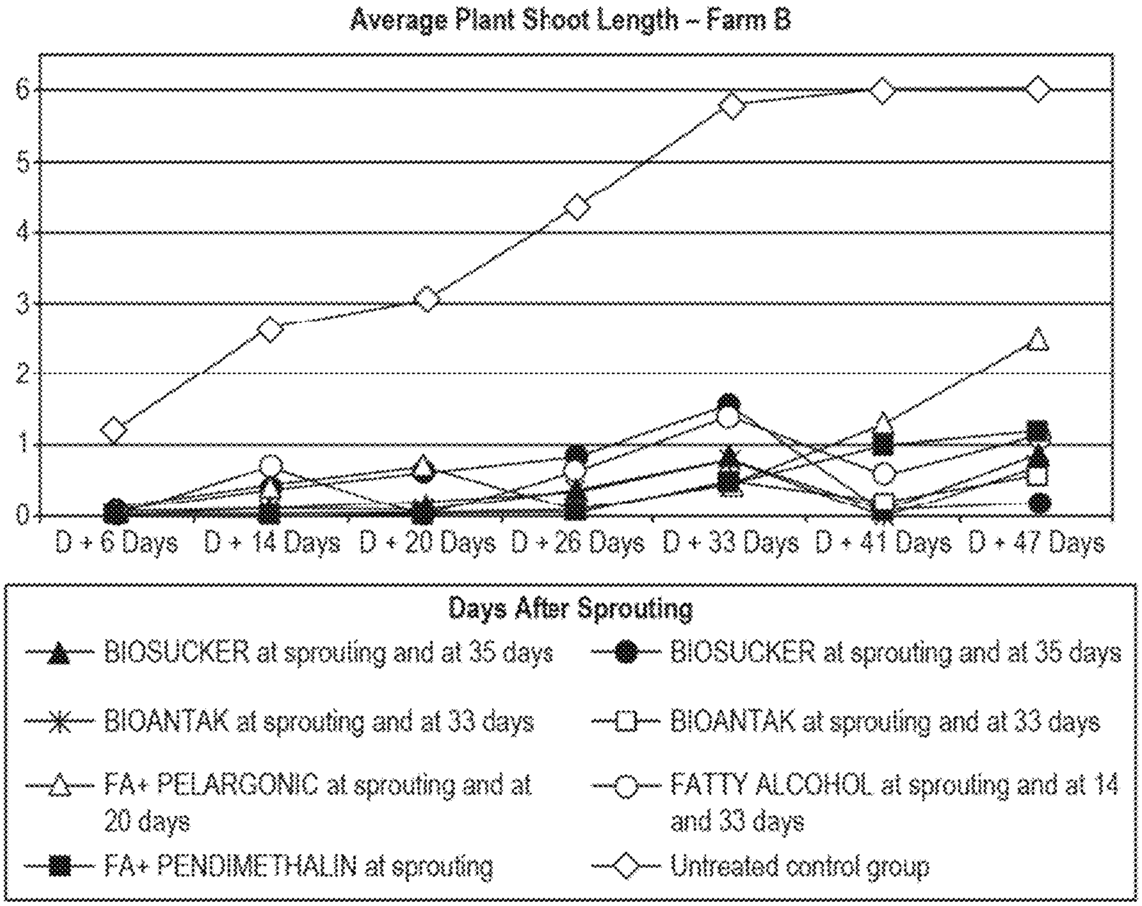
FIG. 8 shows the results of a study at Farm B (Example 4) comparing the effectiveness of various treatments.

As used herein, the singular forms "a," "an," and "the" include plural reference.

The terms "approximately" and "about" mean to be nearly the same as a referenced number or value including an acceptable degree of error for the quantity measured given the nature or precision of the measurements. As used herein, the terms "approximately" and "about" should be generally understood to encompass ±20% of a specified amount, frequency or value. Numerical quantities given herein are approximate unless stated otherwise, meaning that the terms "about" or "approximately" can be inferred when not expressly stated.

The term "axillary bud" refers to a bud that grows from a leaf axil of the plant. The term "leaf axil" refers to the location on the plant where a leaf grows out of the stalk, axis, or out of a shoot or branch of the plant. The terms "axis" or "stalk" refer to the main stem of the plant, from which shoots or branches and leaves may grow.

Embodiments

Without limitation, some embodiments of the disclosure include:

1. A method of inhibiting axillary bud growth of a tobacco plant, comprising: applying a composition comprising a naturally occurring C10 alcohol on the tobacco plant.

2. The method of embodiment 1, wherein the composition is in a form chosen from an emulsion, a composition, and a mixture.

3. The method of any one of embodiments 1-3, wherein the naturally occurring C10 alcohol is citronellol.

4. The method of embodiment 3, wherein the citronellol comprises (+) citronellol and (−) citronellol.

5. The method of embodiment 3, wherein the citronellol is present in a concentration up to about 10% (v/v) of the composition.

6. The method of embodiment 5, wherein the concentration of citronellol is from about 4% to about 6% (v/v) of the composition.

7. The method of any one of embodiments 1-6, wherein the composition further comprises water.

8. The method of any one of embodiments 1-7, wherein the composition further comprises n-decanol.

9. The method of any one of embodiments 1-8, wherein applying comprises spraying the composition.

10. The method of embodiment 9, wherein spraying comprises using a nozzle boom.

11. The method of embodiment 9, wherein spraying comprises using a pressure of about 0.5 bar to about 2.5 bar.

12. The method of any one of embodiments 1-11, wherein applying comprises using a drop line.

13. The method of any one of embodiments 1-12, wherein applying comprises directing the composition on a stalk of the tobacco plant.

14. The method of any one of embodiments 1-13, wherein applying comprises contacting the composition to leaf axils of the tobacco plant.

15. The method of any one of embodiments 1-14, wherein the tobacco plant is in an elongated button stage of development.

16. The method of any one of embodiments 1-15, wherein the tobacco plant comprises open flowers.

17. The method of any one of embodiments 1-16, wherein the tobacco plant comprises at least one axillary bud shoot.

18. The method of embodiment 17, wherein the at least one axillary bud shoot has a length of less than about 8 cm.

19. The method of embodiment 18, wherein the length of the at least one axillary bud shoot is less than about 3 cm.

20. The method of any one of embodiments 1-19, wherein the tobacco plant has a height from about 1.4 m to about 1.7 m.

21. The method of any one of embodiments 1-20, further comprising topping the tobacco plant.

22. The method of embodiment 21, wherein the steps of applying and topping occur within a time period of 48 hours.

23. The method of embodiment 21, wherein the applying step occurs after the topping step.

24. The method of any one of embodiments 1-23, wherein the composition is applied in an amount from about 13 to 60 mL.

25. The method of any one of embodiments 1-24, further comprising reapplying the composition to the tobacco plant.

26. The method of embodiment 25, wherein the reapplying step is performed about 4 to 7 days after the applying step.

27. The method of embodiment 25, wherein the reapplying step is performed about 42 to 56 days after the applying step.

28. The method of embodiment 25, wherein the reapplying step is performed after the formation of at least one new axillary bud on the tobacco plant.

29. The method of any one of embodiments 1-28, wherein, after applying the composition, new axillary bud growth is effectively inhibited for a suppression period of at least 5 days.

30. The method of embodiment 29, wherein the suppression period is at least 7 days.

31. The method of embodiment 30, wherein the suppression period is at least 14 days.

32. The method of embodiment 31, wherein the suppression period is at least 21 days.

33. The method of any one of embodiments 1-32, wherein the naturally occurring C10 alcohol is methanol.

34. The method of any one of embodiments 1-33, wherein the composition is organic.

Compositions and Methods

According to the present disclosure, a method of inhibiting axillary bud growth of a tobacco plant comprises applying a composition comprising a naturally occurring C10 alcohol on the tobacco plant. In certain embodiments, the composition may be in a form chosen from, for example, an emulsion, a solution, or a mixture. In certain embodiments the naturally occurring C10 alcohol may be citronellol. The term "citronellol" refers to any stereoisomer of 3,7-Dimethyloct-6-en-1-ol, sometimes referred to as (+)-β-Citronellol or a natural monoterpenoid. In certain embodiments, the citronellol may comprise both (+) citronellol and (−) citronellol. The terms (+) citronellol and (−) citronellol refer to the two enantiomers of citronellol:

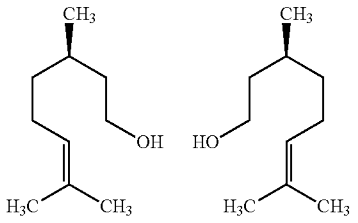

In certain embodiments, the naturally occurring C10 alcohol may be menthol. The term "menthol" refers to any stereoisomer of 5-methyl-2-(propan-2-yl)cyclohexan-1-ol. In certain embodiments, the menthol may comprise a mixture of at least two stereoisomers of menthol. In a preferred embodiment, the menthol comprises (−) menthol. The term (−) menthol refers to the (1R,2S,5R) configuration of menthol:

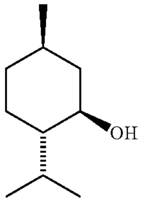

As provided herein, a composition of the present disclosure is a composition comprising a naturally occurring C10 alcohol. In certain embodiments, the composition may further comprise water. In certain embodiments, the naturally occurring C10 alcohol may be present in a concentration up to about 10% (v/v) of the composition. In certain embodiments, the naturally occurring C10 alcohol may be present in a concentration from about 4% to about 6% (v/v) of the composition. In some further embodiments, the naturally occurring C10 alcohol is citronellol.

In one or more embodiments, the naturally occurring C10 alcohol may be "organic"; the term "organic" refers to C10 alcohol sourced or produced by, e.g., plants, complying with the standards of organic farming. Those standards vary worldwide, but generally, organic farming seeks to cycle resources, produce ecological balance, and conserve biodiversity by restricting certain pesticides and fertilizers and typically does not use irradiation, industrial solvents, and/or certain synthetic additives. In certain embodiments, the naturally occurring C10 alcohol is an extraction product. For example, citronellol may be sourced from geranium, rose, and other plants or plant oils and menthol may be sourced from corn mint, peppermint, or other mints. The U.S. Food and Drug Administration construes both citronellol and menthol as generally recognized as safe (GRAS) for food use. In some embodiments, the composition comprising the naturally occurring C10 alcohol may also be organic.

The composition of the present disclosure may further comprise additional ingredients commonly used in agricultural products such as surfactants (e.g., ionic, nonionic, cationic, anionic, and/or zwitterionic). For example, in certain embodiments, the composition may further comprise one or more non-ionic surfactants such as Polysorbate 80 ("PS80", "Tween 80").

The composition may further comprise at least one additional axillary bud inhibitor such as a contact, a contact systemic, or a systemic. The term "contact" refers to chemicals comprising fatty alcohols that may physically burn an axillary bud. In some embodiments, the composition may further comprise at least one contact chemical such as decanol or pelargonic acid. The term "contact systemic" refers to chemicals that may be absorbed into the plant at the leaf axil and inhibit cell division in axil buds locally. In certain embodiments, the composition may further comprise at least one contact systemic, for example, pendimethalin or a substance chosen from the group dinitroaniline, such as butralin or flumetralin. The term "systemic" refers to chemicals that may be absorbed by the plant at locations not limited to leaf axils and that, nevertheless, may inhibit cell division in axil buds systemically. In certain embodiments, the composition may further comprise at least one systemic such as maleic hydrazide.

In some embodiments, applying the composition may comprise spraying the composition. For example, spraying may be accomplished by, but not limited to, using powered spray equipment; using a hand sprayer, such as a backpack and wand; using a straight-boom or a multi-nozzle boom, for example, a three-nozzle boom; using a coarse nozzle; using a fine nozzle; using a conveyer hood; and any combinations thereof. In some embodiments spraying may comprise using a pressure of about 0.5 bar to about 2.5 bar.

In some embodiments, applying the composition may comprise using a drop line. In some embodiments, applying the composition may comprise using a jug.

In some embodiments, applying the composition may comprise contacting the composition to the stalk of the tobacco plant. In some embodiments, applying the composition may comprise contacting the composition to leaf axils of the tobacco plant. In some embodiments, applying the composition may comprise the composition running down the stalk of the tobacco plant in order to contact leaf axils.

Application of the composition can occur at various stages of tobacco plant development. For example, the tobacco plant may be in a button stage of development or an elongated button stage of development. In some embodiments, the tobacco plant may comprise open flowers. In some embodiments, the tobacco plant may comprise at least one axillary bud or shoot. In some embodiments, the at least one axillary bud or shoot may have a length of less than about 8 cm. In some embodiments, the at least one axillary bud shoot may have a length of less than about 3 cm. In some embodiments, the tobacco plant may have a height from about 1.4 to 1.7 m.

Methods of the present disclosure may further comprise topping the tobacco plant. In some embodiments, the steps of applying the composition and topping may occur within a time period of 48 hours. In some embodiments, the applying step may occur before the topping step. In other embodiments, the applying step may occur after the topping step.

The method of the present disclosure applies an effective amount of the composition to the tobacco plant. The phrase "effective amount" refers to an amount sufficient to improve the inhibition of axillary bud growth as compared to a control. In some embodiments, the composition applied to the tobacco plant may be in an amount from about 13 to about 60 mL per plant.

The method of the present disclosure may further comprise reapplying the composition to the tobacco plant. In some embodiments, the reapplying step may be performed about 4 to about 7 days after the applying step. In some embodiments, the reapplying step may be performed about 7 to about 14 days after the applying step. In some embodiments, the reapplying step may be performed about 14 to about 21 days after the applying step. In some embodiments, the reapplying step may be performed about 21 to about 35 days after the applying step. In some embodiments, the reapplying step may be performed about 35 to about 43 days after the applying step. In some embodiments, the reapplying step may be performed about 42 to about 56 days after the applying step. In some embodiments, the reapplying step may be performed after the formation of at least one new axillary bud or shoot on the tobacco plant.

In some embodiments, after applying the composition, the formation of axillary buds or shoots may be effectively inhibited for a suppression period of, for example, about 5 days, about 7 days, about 14 days, about 21 days, or any time period in between. In some embodiments, after the applying the composition, the growth of axillary buds may be inhibited for a suppression period of, for example, 5 days, 7 days, 14, days, 21 days, or any time period in between.

As evidenced from the Examples and without being bound by a particular theory, the application of citronellol to the tobacco plant does not remove the sucker bud or shoot and instead, the sucker bud remains green on the pant but does not grow and remains on the leaf axil. Typically, when tobacco is treated with fatty alcohols such as decanol, the sucker bud turns brown and falls off, leading the tobacco plant to replace the fallen-off bud.

All publications and patents mentioned herein are hereby incorporated by reference in their entirety as if each individual publication or patent was specifically and individually indicated to be incorporated by reference.

Claims or descriptions that include "or" or "and/or" between at least one member of a group are considered satisfied if one, more than one, or all of the group members are present in, employed in, or otherwise relevant to a given product or process unless indicated to the contrary or otherwise evident from the context. The disclosure includes embodiments in which exactly one member of the group is present in, employed in, or otherwise relevant to a given product or process. The disclosure includes embodiments in which more than one, or all the group members are present in, employed in, or otherwise relevant to a given product or process.

Furthermore, the disclosure encompasses all variations, combinations, and permutations in which at least one limitation, element, clause, and descriptive term from at least one of the listed claims is introduced into another claim. For example, any claim that is dependent on another claim can be modified to include at least one limitation found in any other claim that is dependent on the same base claim. Where elements are presented as lists, e.g., in Markush group format, each subgroup of the elements is also disclosed, and any element(s) can be removed from the group. It should be understood that, in general, where the disclosure, or aspects of the disclosure, is/are referred to as comprising particular elements and/or features, embodiments of the disclosure or aspects of the disclosure consist, or consist essentially of, such elements and/or features. For purposes of simplicity, those embodiments have not been specifically set forth in haec verba herein. Where ranges are given, endpoints are included. Furthermore, unless otherwise indicated or otherwise evident from the context and understanding of one of ordinary skill in the art, values that are expressed as ranges can assume any specific value or sub-range within the stated ranges in different embodiments of the disclosure, to the tenth of the unit of the lower limit of the range, unless the context clearly dictates otherwise.

Those of ordinary skill in the art will recognize or be able to ascertain using no more than routine experimentation, many equivalents to the specific embodiments of the disclosure described herein. Such equivalents are intended to be encompassed by the following claims.

EXAMPLES

The following examples are intended to be illustrative and are not meant in any way to limit the scope of the disclosure.

Example 1: Effects of Various Axillary Bud Inhibitors Using Similar Conditions

A single site field trial was conducted at the Oxford Tobacco Research Station in Oxford, NC to evaluate the effects of various axillary bud inhibitors (5MHOT, 5MHCT, 37DOT, and 37DCT, as noted in Table 1 below). Each product was diluted in water and applied with a 3-nozzle boom at 1.5, 3.0, and 6.0% concentration (v/v) a total of seven times. A subset of treatments containing each material at the 3.0% concentration was applied using a dropline. Organic fatty alcohol (O-Tac) was included as a positive control (4.0% concentration applied with 3-nozzle boom and dropline). The undiluted composition of each inhibitor is provided in Table 1, below.

TABLE 1

Inhibitor Compositions

| Inhibitor | Component | % (w/w) |
|---|---|---|
| 5MHOT | Menthol | 59.5 |
| | Hexanol | 25.5 |
| | Tween 80 | 15.0 |
| 5MHCT | Menthol | 59.5 |
| | Hexanol | 15.5 |
| | Decanol | 10.0 |
| | Tween 80 | 15.0 |
| 37DOT | Citronellol | 85.0 |
| (Bioantak) | Tween 80 | 15.0 |
| 37DCT | Citronellol | 75.0 |
| | Decanol | 10.0 |
| | Tween 80 | 15.0 |
| O-Tac | Octanol | 36.2 |
| | Decanol | 48.2 |
| | Related Compounds (Dodecanol) | 0.3 |
| | Inactive Ingredients | 15.3 |

A topped but not physically or chemically suckered treatment was used as a negative control but was not included in the data analyses. Treatments were arranged in a randomized complete block design and replicated four times.

Each treatment was applied a total of seven times on a five-day spray rotation. Treatments were initiated at the 50% elongated button stage of growth (July 16) and were repeated on July 22, July 26, July 31, August 8, August 13, and August 19. At the conclusion of harvest, five plants per plot were assessed for sucker number and sucker mass. Visual injury assessments were carried out prior to application numbers 2, 4, and 6 in order to determine injury potential from each treatment. Cured leaf yield, quality, and value were likewise quantified.

TABLE 2

Tobacco injury, sucker growth, cured leaf quality, and crop value as influenced by the main effects of suckercide product (5MHOT, 5MHCT, 37DOT, and 37DCT) and application concentration (1.5, 3.0, and 6.0%).[a]

| Main Effect | Injury-July 22 ---------- %[b] | Injury-July 31 ---------- | Sucker Mass g/plant | Sucker Count num./plant | Control % | Quality | Value $/acre |
|---|---|---|---|---|---|---|---|
| Product | | | | | | | |
| 5MHOT | 0.04 a | 0.13 a | 696.5 a | 3.73 a | 19.7 b | 77 a | 2,956 b |
| 5MHCT | 0.04 a | 0.17 a | 539.2 b | 3.28 ab | 31.8 b | 80 a | 3,434 ab |
| 37DOT | 0.08 a | 0.50 a | 325.2 c | 2.52 b | 64.0 a | 83 a | 3,792 a |
| 37DCT | 0.17 a | 0.25 a | 271.7 c | 2.80 b | 58.7 a | 82 a | 3,625 a |
| Conc. | | | | | | | |
| 1.5% | 0.00 A | 0.00 B | 705.9 A | 3.80 A | 17.6 C | 81 a | 2,474 c |
| 3.0% | 0.09 A | 0.06 B | 479.3 B | 2.94 B | 39.6 B | 79 a | 3,497 b |
| 6.0% | 0.16 A | 0.72 A | 189.4 C | 2.51 B | 73.4 A | 81 a | 4,385 a |

[a]Treatment means followed by the same letter within the same column and main effect are not significantly different at the $\alpha = 0.05$ level.
[b]Visual injury assessed on a scale of 0-100, with 100 representing complete plant death.

TABLE 3

Tobacco injury, sucker mass, and yield, as influenced by the interaction of sucker control product (5MHOT, 5MHCT, 37DOT, and 37DCT) and application concentration (1.5, 3.0, and 6.0%).[a]

| Treatment | Injury - Aug. 13 %[b] | Sucker Mass grams/sucker | Yield lbs/acre |
|---|---|---|---|
| 5MHOT @ 1.5% | 0.00 d | 187.35 bc | 1,351 d |
| 5MHOT @ 3.0% | 0.13 d | 307.9 a | 1,789 c |

TABLE 3-continued

Tobacco injury, sucker mass, and yield, as influenced by the interaction of sucker control product (5MHOT, 5MHCT, 37DOT, and 37DCT) and application concentration (1.5, 3.0, and 6.0%).[a]

| Treatment | Injury - Aug. 13 %[b] | Sucker Mass grams/sucker | Yield lbs/acre |
|---|---|---|---|
| 5MHOT @ 6.0% | 0.50 cd | 126.5 cd | 2,507 ab |
| 5MHCT @ 1.5% | 0.25 d | 186.6 bc | 1,603 cd |
| 5MHCT @ 3.0% | 0.38 cd | 261.5 ab | 1,785 c |
| 5MHCT @ 6.0% | 1.25 bc | 61.8 d | 2,820 a |
| 37DOT @ 1.5% | 0.00 d | 201.8 bc | 1,678 cd |
| 37DOT @ 3.0% | 0.50 cd | 99.7 cd | 2,352 b |
| 37DOT @ 6.0% | 1.88 b | 35.1 d | 2,517 ab |
| 37DCT @ 1.5% | 0.25 d | 191.3 bc | 1,380 cd |
| 37DCT @ 3.0% | 0.38 cd | 81.2 d | 2,559 ab |
| 37DCT @ 6.0% | 3.25 a | 42.7 d | 2,474 ab |

[a]Treatment means followed by the same letter within the same column and main effect are not significantly different at the α = 0.05 level.
[b]Visual injury assessed on a scale of 0-100, with 100 representing complete plant death.

In Table 2, only pairwise treatments were analyzed in order to test the main effects of the respective suckercide products (5MHOT, 5MHCT, 37DOT, and 37DCT) and application concentration (1.5, 3.0, and 6.0%). Both O-Tac and all dropline treatments were excluded from the analysis. Injury was generally very minimal in this trial and was largely insignificant following application number one (Table 2). At the second injury rating, injury was similar among suckercides, but was promoted as concentration increased from 3.0 to 6.0% (Table 2). At injury rating number three, the greatest injury was documented in the 37DCT-6.0% application (3.25%); however, injury generally increased as each product concentration increased (Table 3). At the conclusion of the season, sucker mass and sucker number per plant was greatest in the 5MHOT treatments and were followed by 5MHCT (Table 2). The application of 37DOT and 37DCT resulted in less sucker growth and promoted total sucker control (Table 2). Likewise, application concentration influenced sucker growth, with the 1.5% concentration generally having less efficacy than the 3.0 and 6.0% concentration (Table 2). Cured leaf yield was generally maximized when each compound was applied at the 6.0% concentration (Table 3) although leaf quality was not impacted (Table 2). Finally, cured leaf value was greatest in treatments receiving 37DOT or 37DCT and was lowest following applications of 5MHOT (Table 2). The value of 5MHCT was in between these groups of treatments (Table 2).

TABLE 4

Tobacco injury following the application of various sucker control programs.[a]

| Treatment | Injury-July 22 | Injury-July 31 | Injury-Aug. 13 |
|---|---|---|---|
| | % | | |
| 5MHOT @ 1.5% - OT | 0.00 a | 0.00 d | 0.00 e |
| 5MHOT @ 3.0% - OT | 0.13 a | 0.00 d | 0.13 e |
| 5MHOT @ 6.0% - OT | 0.00 a | 0.38 b-d | 0.50 c-e |
| 5MHCT @ 1.5% - OT | 0.00 a | 0.00 d | 0.25 de |
| 5MHCT @ 3.0% - OT | 0.13 a | 0.00 d | 0.38 de |
| 5MHCT @ 6.0% - OT | 0.00 a | 0.50 bc | 1.25 bc |
| 37DOT @ 1.5% - OT | 0.00 a | 0.00 d | 0.00 e |
| 37DOT @ 3.0% - OT | 0.00 a | 0.13 cd | 0.50 c-e |
| 37DOT @ 6.0% - OT | 0.25 a | 1.38 a | 1.88 b |
| 37DCT @ 1.5% - OT | 0.00 a | 0.00 d | 0.25 de |
| 37DCT @ 3.0% - OT | 0.13 a | 0.13 cd | 0.38 de |
| 37DCT @ 6.0% - OT | 0.38 a | 0.63 b | 3.25 a |
| 5MHOT @ 3.0% - DL | 0.00 a | 0.00 d | 0.13 e |
| 5MHCT @ 3.0% - DL | 0.00 a | 0.00 d | 0.13 e |
| 37DOT @ 3.0% - DL | 0.00 a | 0.00 d | 0.50 c-e |
| 37DCT @ 3.0% - DL | 0.00 a | 0.00 d | 0.38 de |
| O-Tac @ 4% - OT | 0.13 a | 0.25 b-d | 1.00 cd |
| O-Tac @ 4% - DL | 0.13 a | 0.00 d | 0.50 c-e |

[a]Treatment means followed by the same letter within the same column are not significantly different at the α = 0.05 level.

TABLE 5

Tobacco sucker control following the application of various sucker control programs.[a]

| Treatment | Sucker Mass grams/plant | Sucker Count num./plant | Sucker Mass grams/sucker | Control % |
|---|---|---|---|---|
| 5MHOT @ 1.5% - OT | 961.4 a | 5.25 a | 187.3 b-d | 0.0 g |
| 5MHOT @ 3.0% - OT | 787.1 ab | 2.70 b-e | 307.9 a | 9.3 fg |
| 5MHOT @ 6.0% - OT | 341.1 d-f | 3.25 b-d | 126.5 c-f | 49.8 b-d |
| 5MHCT @ 1.5% - OT | 688.1 bc | 3.60 bc | 186.6 b-d | 16.1 e-g |
| 5MHCT @ 3.0% - OT | 714.8 a-c | 2.70 b-e | 261.5 ab | 8.0 fg |
| 5MHCT @ 6.0% - OT | 214.7 f | 3.55 bc | 61.8 ef | 71.4 ab |
| 37DOT @ 1.5% - OT | 482.0 c-e | 2.60 c-e | 201.8 bc | 38.9 c-e |
| 37DOT @ 3.0% - OT | 238.9 ef | 2.45 c-e | 99.7 d-f | 66.1 a-c |
| 37DOT @ 6.0% - OT | 94.3 f | 2.50 c-e | 35.1 f | 86.9 a |
| 37DCT @ 1.5% - OT | 692.0 bc | 3.75 bc | 191.3 b-d | 15.3 e-g |
| 37DCT @ 3.0% - OT | 176.3 f | 2.20 de | 81.2 ef | 75.1 ab |
| 37DCT @ 6.0% - OT | 107.5 f | 2.45 c-e | 42.7 f | 85.7 a |
| 5MHOT @ 3.0% - DL | 507.3 cd | 3.25 b-d | 160.9 b-e | 35.4 d-f |
| 5MHCT @ 3.0% - DL | 604.0 bc | 2.80 b-e | 222.1 a-c | 22.5 d-g |
| 37DOT @ 3.0% - DL | 199.25 f | 3.00 b-e | 72.7 ef | 73.4 ab |
| 37DCT @ 3.0% - DL | 222.3 f | 1.80 e | 121.4 c-f | 71.7 ab |
| O-Tac @ 4% - OT | 130.3 f | 3.05 b-e | 43.3 f | 82.3 a |
| O-Tac @ 4% - DL | 205.2 f | 3.95 ab | 55.3 f | 71.7 ab |

[a]Treatment means followed by the same letter within the same column are not significantly different at the $\alpha = 0.05$ level.

TABLE 6

Tobacco yield, quality, and value following the application of various sucker control programs.[a]

| Treatment | Yield lbs/acre | Quality | Value $/acre |
|---|---|---|---|
| 5MHOT @ 1.5%-OT | 1,351 e | 81 a | 2,169 f |
| 5MHOT @ 3.0%-OT | 1,789 d | 73 a | 2,638 e-f |
| 5MHOT @ 6.0%-OT | 2,507 a-c | 78 a | 4,061 a-c |
| 5MHCT @ 1.5%-OT | 1,603 de | 80 a | 2,645 d-f |
| 5MHCT @ 3.0%-OT | 1,785 d | 80 a | 2,962 d-f |
| 5MHCT @ 6.0%-OT | 2,820 ab | 80 a | 4,697 a |
| 37DOT @ 1.5%-OT | 1,678 de | 81 a | 2,774 d-f |
| 37DOT @ 3.0%-OT | 2,352 c | 84 a | 4,167 a-c |
| 37DOT @ 6.0%-OT | 2,517 a-c | 84 a | 4,436 a |
| 37DCT @ 1.5%-OT | 1,380 e | 83 a | 2,310 ef |
| 37DCT @ 3.0%-OT | 2,559 a-c | 79 a | 4,220 ab |
| 37DCT @ 6.0%-OT | 2,474 a-c | 83 a | 4,347 a |
| 5MHOT @ 3.0%-DL | 1,927 d | 81 a | 3,236 c-e |
| 5MHCT @ 3.0%-DL | 1,937 d | 85 a | 3,404 b-d |
| 37DOT @ 3.0%-DL | 2,474 a-c | 78 a | 4,082 a-c |
| 37DCT @ 3.0%-DL | 2,439 bc | 87 a | 4,436 a |
| O-Tac @ 4%-OT | 2,853 a | 79 a | 4,816 a |
| O-Tac @ 4%-DL | 2,730 ab | 85 a | 4,910 a |

[a]Treatment means followed by the same letter within the same column are not significantly different at the $\alpha = 0.05$ level.

Following application number one, leaf injury was similar among treatments and ranged from 0.0 to 0.5% (Table 4). Within the second injury rating, 37DOT—6% produced the highest injury (1.38%) (Table 4). All other injury ratings were <1.0% within this interval (Table 4). 37DCT—6% had the highest injury rating within the third interval (3.25%); however, other 6.0% concentrations produced injury >1.0% (Table 4). Dropline applications and O-Tac applications generally resulted in reduced injury (Table 4). As with the first data analysis, sucker control efficacy appears to have influenced cured leaf yield and value (Table 6). O-Tac treatments consistently produced the highest yielding and highest value treatments, although 6.0% concentrations were generally similar (Table 6).

Results were consistent in that as application concentration declined, yield and value were negatively impacted as well. This is consistent with declines in sucker control in those treatments (Table 5). Cured leaf quality was not affected (Table 6).

Based on this study, 37DOT and 37DCT are generally superior to 5MHOT and 5MHCT in terms of sucker control efficacy (Table 5). In addition, the 6.0% concentrations of each material are more promising than the 3.0 and 1.5% concentrations (Table 5). Despite the high concentration relative to other commercial products, the injury potential appears to be minimal.

Example 2: Effectiveness of Various Axillary Bud Inhibitors

An additional study was conducted comparing the effects of five treatments against an untreated control group. The five treatments were 5% 37DOT, 6% 37 DOT, 7% 37DOT, and 4% ANTAK-68.5. The undiluted composition of 37DOT is as provided in Table 1. The active ingredient in ANTAK-68.5 is 68.5% 1-Decanol. All treatments were applied to assigned plots of Virginian C 4M tobacco in a typical tobacco zone in Barqilla de Pinares (South-west Spain). The first application was performed just after manual topping. A second application was performed 42 days later. Overall weather conditions during the study were normal. Following the first application, two days passed before the plants received moisture. Following the second application, 14 days passed before the plants received moisture. Each treatment composition employed water as the carrier, and in each application a spray volume of 300 L/ha was applied at pressure of 1 atm or 1 bar. The first application was performed after manual topping, when the plants were in the button stage of growth. The compositions were applied directly on the apical part of the plant with a fine stream to allow the compositions to run down the stalk and wet the leaf axils. The study employed a randomized complete block design comparing five treatments and one control.

The condition of the plants was observed and recorded on the day of the first application and 7, 14, and 21 days thereafter. The condition of the plants was also observed and recorded on the day of the second application and 7, 13, and 21 days thereafter. The efficacy of the several treatments was measured by counting the number of axillary shoots within each of four shoot-length ranges. Level 1 was assigned to shoots 0-3 cm in length. Level 2 was assigned to shoots 4-8 cm in length. Level 3 was assigned to shoots 9-15 cm in length. Level 4 was assigned to shoots greater than 15 cm in length. The plants were investigated for signs of phytotoxicity at 7, 14, 21 and 42 days after the first application and 7, 13, and 21 days after the second application.

TABLE 7

Results of Study 2

| | | | | | |
|---|---|---|---|---|---|
| Crop Type, Code | C NIOTA | C NIOTA | C NIOTA | C NIOTA | C NIOTA |
| BBCH Scale | BDIC | BDIC | BDIC | BDIC | BDIC |
| Crop Scientific Name | Nicotiana taba> | Nicotiana taba> | Nicotiana taba> | Nicotiana taba> | Nicotiana taba> |
| Crop Name | Virginian toba> | Virginian toba> | Virginian toba> | Virginian toba> | Virginian toba> |
| Crop Variety | C4M | C4M | C4M | C4M | C4M |
| Description | PHYGEN | PHYGEN | PHYGEN | PHYGEN | PHYGEN |
| Rating Date | 26 Jul. 2019 | 2 Aug. 2019 | 9 Aug. 2019 | 30 Aug. 2019 | 6 Sep. 2019 |
| SE Group No. | 1 | 64 | 65 | 66 | 67 |
| Part Rated | PLANT C | PLANT C | PLANT C | PLANT C | PLANT C |
| Rating Type | PHYGEN | PHYGEN | PHYGEN | PHYGEN | PHYGEN |
| Rating Unit | % | % | % | % | % |
| Sample Size | 1 PLOT | 1 PLOT | 1 PLOT | 1 PLOT | 1 PLOT |
| Collection Basis | 1 PLOT | 1 PLOT | 1 PLOT | 1 PLOT | 1 PLOT |
| Reporting Basis | 1 PLOT | 1 PLOT | 1 PLOT | 1 PLOT | 1 PLOT |
| Number of Subsamples | 1 | 1 | 1 | 1 | 1 |
| Crop Stage Scale | BBCH | BBCH | BBCH | BBCH | BBCH |
| Crop Stage Majority | 62 | 65 | 93 | 93 | 95 |
| Crop Stage Minimum/Maximum | 61 63 | 64 67 | 85 95 | 85 95 | 93 95 |
| Crop Density | 35 PLANT | 35 PLANT | 35 PLANT | 35 PLANT | 35 PLANT |
| Footnote Number | | | | | |
| Assessed By | Moreno, J. | Moreno, J. | Moreno, J. | Moreno, J. | Moreno, J. |
| Days After First/Last Applic. | 7 7 | 14 14 | 21 21 | 42 42 | 49 7 |
| Trt-Eval Interval | 7 DA-A | 14 DA-A | 21 DA-A | 42 DA-A | 7 DA-B |
| ARM Action Codes | | | | | |
| Number of Decimals | 2 | 2 | 2 | 2 | 2 |

| Trt No. | Treatment Name | Appl Code | 1* | 2* | 3* | 4* | 5* |
|---|---|---|---|---|---|---|---|
| 1 | Untreated Check | | | | | | |
| 2 | 37DOT | AB | 0.00 | 0.00 | 0.00 | 0.00 | 0.00 |
| 3 | 37DOT | AB | 0.00 | 0.00 | 0.00 | 0.00 | 0.00 |
| 4 | 37DOT | AB | 0.00 | 0.00 | 0.00 | 0.00 | 0.00 |
| 5 | ANTAK 68.5 | AB | 0.00 | 0.00 | 0.00 | 0.00 | 0.00 |
| | LSD P = Various | | . | . | . | . | . |
| | Standard Deviation | | 0.000 | 0.000 | 0.000 | 0.000 | 0.000 |
| | CV | | 0.0 | 0.0 | 0.0 | 0.0 | 0.0 |
| | Levene's F | | 0.00 | 0.00 | 0.00 | 0.00 | 0.00 |
| | Levene's Prob(F) | | . | . | . | . | . |
| | Skewness | | . | . | . | . | . |
| | Kurtosis | | . | . | . | . | . |
| | Mean Sep. Test | | | | | | |
| | Replicate F | | 0.000 | 0.000 | 0.000 | 0.000 | 0.000 |
| | Replicate Prob(F) | | 1.0000 | 1.0000 | 1.0000 | 1.0000 | 1.0000 |
| | Treatment F | | 0.000 | 0.000 | 0.000 | 0.000 | 0.000 |
| | Treatment Prob(F) | | 1.0000 | 1.0000 | 1.0000 | 1.0000 | 1.0000 |

Means followed by same letter or symbol do not significantly differ

Mean comparisons performed only when AOV Treatment P(F) is significant at mean comparison OSL.

* Adjusted means

Could not calculate LSD (% mean diff) for columns 1, 2, 3, 4, 5, 6, 7, 9, 10, 11, 12, 16, 17, 22, 35, 40, 41, 46, 57, 58, 59, 60, 61, 62, 63 because error mean square = 0.

| | | | | | |
|---|---|---|---|---|---|
| Crop Type, Code | C NIOTA | C NIOTA | C NIOTA | C NIOTA | C NIOTA |
| BBCH Scale | BDIC | BDIC | BDIC | BDIC | BDIC |
| Crop Scientific Name | Nicotiana taba> | Nicotiana taba> | Nicotiana taba> | Nicotiana taba> | Nicotiana taba> |
| Crop Name | Virginian toba> | Virginian toba> | Virginian toba> | Virginian toba> | Virginian toba> |
| Crop Variety | C4M | C4M | C4M | C4M | C4M |
| Description | PHYGEN | PHYGEN | number of regr> | level 1 | level 2 |
| Rating Date | 12 Sep. 2019 | 20 Sep. 2019 | 19 Jul. 2019 | 19 Jul. 2019 | 19 Jul. 2019 |
| SE Group No. | 68 | 69 | 70 | 71 | 72 |
| Part Rated | PLANT C | PLANT C | PLANT C | PLANT C | PLANT C |
| Rating Type | PHYGEN | PHYGEN | COPLPA | REGROW | REGROW |
| Rating Unit | % | % | NUMBER | NUMBER | NUMBER |
| Sample Size | 1 PLOT | 1 PLOT | 1 PLOT | 1 PLOT | 1 PLOT |

-continued

| | | | | | |
|---|---|---|---|---|---|
| Collection Basis | 1 PLOT | 1 PLOT | 1 PLOT | 1 PLOT | 1 PLOT |
| Reporting Basis | 1 PLOT | 1 PLOT | 1 PLOT | 1 PLOT | 1 PLOT |
| Number of Subsamples | 1 | 1 | 1 | 1 | 1 |
| Crop Stage Scale | BBCH | BBCH | BBCH | BBCH | BBCH |
| Crop Stage Majority | 95 | 95 | 61 | 61 | 61 |
| Crop Stage Minimum/Maximum | 93 95 | 93 95 | 61 62 | 61 62 | 61 62 |
| Crop Density | 35 PLANT | 35 PLANT | 35 PLANT | 35 PLANT | 35 PLANT |
| Footnote Number | | | 1 | 2 | 3 |
| Assessed By | Moreno, J. | Moreno, J. | Moreno, J. | Moreno, J. | Moreno, J. |
| Days After First/Last Applic. | 55 13 | 63 21 | 0 0 | 0 0 | 0 0 |
| Trt-Eval Interval | 13 DA-B | 21 DA-B | 0 DA-A | 0 DA-A | 0 DA-A |
| ARM Action Codes | | | S05 | S05 | S05 |
| Number of Decimals | 2 | 2 | 2 | 2 | 2 |

| Trt No. | Treatment Name | Appl Code | 6* | 7* | 8* | 9* | 10* |
|---|---|---|---|---|---|---|---|
| 1 | Untreated Check | | | | 108.75- | 108.75- | 0.00- |
| 2 | 37DOT | AB | 0.00 | 0.00 | 108.75- | 108.75- | 0.00- |
| 3 | 37DOT | AB | 0.00 | 0.00 | 108.75- | 108.75- | 0.00- |
| 4 | 37DOT | AB | 0.00 | 0.00 | 108.75- | 108.75- | 0.00- |
| 5 | ANTAK 68.5 | AB | 0.00 | 0.00 | 109.00- | 109.00- | 0.00- |
| | LSD P = Various | | . | . | 2.345 | 2.345 | . |
| | Standard Deviation | | 0.000 | 0.000 | 1.522 | 1.522 | 0.000 |
| | CV | | 0.0 | 0.0 | 1.4 | 1.4 | 0.0 |
| | Levene's F | | 0.00 | 0.00 | 2.114 | 2.114 | 0.00 |
| | Levene's Prob(F) | | . | . | 0.13 | 0.13 | . |
| | Skewness | | . | . | −0.2027 | −0.2027 | . |
| | Kurtosis | | . | . | 1.0681 | 1.0681 | . |
| | Mean Sep. Test | | | | SNK.05 | SNK.05 | SNK.05 |
| | Replicate F | | 0.000 | 0.000 | 2.475 | 2.475 | 0.000 |
| | Replicate Prob(F) | | 1.0000 | 1.0000 | 0.1115 | 0.1115 | 1.0000 |
| | Treatment F | | 0.000 | 10.000 | 0.022 | 0.022 | 0.000 |
| | Treatment Prob(F) | | 1.0000 | 1.0000 | 0.9990 | 0.9990 | 1.0000 |

Means followed by same letter or symbol do not significantly differ

Mean comparisons performed only when AOV Treatment P(F) is significant at mean comparison OSL.

*Adjusted means

Could not calculate LSD (% mean diff) for columns 1, 2, 3, 4, 5, 6, 7, 9, 10, 11, 12, 16, 17, 22, 35, 40, 41, 46, 57, 58, 59, 60, 61, 62, 63 because error mean square = 0.

| | | | | | |
|---|---|---|---|---|---|
| Crop Type, Code | C NIOTA | C NIOTA | C NIOTA | C NIOTA | C NIOTA |
| BBCH Scale | BDIC | BDIC | BDIC | BDIC | BDIC |
| Crop Scientific Name | Nicotiana taba> | Nicotiana taba> | Nicotiana taba> | Nicotiana taba> | Nicotiana taba> |
| Crop Name | Virginian toba> | Virginian toba> | Virginian toba> | Virginian toba> | Virginian toba> |
| Crop Variety | C4M | C4M | C4M | C4M | C4M |
| Description | level 3 | level 4 | number of regr> | level 1 | level 2 |
| Rating Date | 19 Jul. 2019 | 19 Jul. 2019 | 26 Jul. 2019 | 26 Jul. 2019 | 26 Jul. 2019 |
| SE Group No. | 73 | 74 | 75 | 76 | 77 |
| Part Rated | PLANT C | PLANT C | PLANT C | PLANT C | PLANT C |
| Rating Type | REGROW | REGROW | COPLPA | REGROW | REGROW |
| Rating Unit | NUMBER | NUMBER | NUMBER | NUMBER | NUMBER |
| Sample Size | 1 PLOT | 1 PLOT | 1 PLOT | 1 PLOT | 1 PLOT |
| Collection Basis | 1 PLOT | 1 PLOT | 1 PLOT | 1 PLOT | 1 PLOT |
| Reporting Basis | 1 PLOT | 1 PLOT | 1 PLOT | 1 PLOT | 1 PLOT |
| Number of Subsamples | 1 | 1 | 1 | 1 | 1 |
| Crop Stage Scale | BBCH | BBCH | BBCH | BBCH | BBCH |
| Crop Stage Majority | 61 | 61 | 62 | 62 | 62 |
| Crop Stage Minimum/Maximum | 61 62 | 61 62 | 61 63 | 61 63 | 61 63 |
| Crop Density | 35 PLANT | 35 PLANT | 35 PLANT | 35 PLANT | 35 PLANT |
| Footnote Number | 4 | 5 | 1 | 2 | 3 |
| Assessed By | Moreno, J. | Moreno, J. | Moreno, J. | Moreno, J. | Moreno, J. |
| Days After First/Last Applic. | 0 0 | 0 0 | 7 7 | 7 7 | 7 7 |

-continued

| Trt-Eval Interval | | | 0 DA-A | 0 DA-A | 7 DA-A | 7 DA-A | 7 DA-A |
|---|---|---|---|---|---|---|---|
| ARM Action Codes | | | S05 | S05 | S05 | S05 | S05 |
| Number of Decimals | | | 2 | 2 | 2 | 2 | 2 |
| Trt No. | Treatment Name | Appl Code | 11* | 12* | 13* | 14* | 15* |
| 1 | Untreated Check | | 0.00- | 0.00- | 108.25a | 92.25a | 16.00a |
| 2 | 37DOT | AB | 0.00- | 0.00- | 0.00b | 0.00b | 0.00b |
| 3 | 37DOT | AB | 0.00- | 0.00- | 0.00b | 0.00b | 0.00b |
| 4 | 37DOT | AB | 0.00- | 0.00- | 0.00b | 0.00b | 0.00b |
| 5 | ANTAK 68.5 | AB | 0.00- | 0.00- | 0.00b | 0.00b | 0.00b |
| LSD P = Various | | | . | . | 1.979 | 2.601 | 0.796 |
| Standard Deviation | | | 0.000 | 0.000 | 1.285 | 1.688 | 0.516 |
| CV | | | 0.0 | 0.0 | 5.93 | 9.15 | 16.14 |
| Levene's F | | | 0.00 | 0.00 | 2.882 | 7.118 | 0.00 |
| Levene's Prob(F) | | | . | . | 0.059 | 0.002* | . |

Means followed by same letter or symbol do not significantly differ

Mean comparisons performed only when AOV Treatment P(F) is significant at mean comparison OSL.

* Adjusted means

Could not calculate LSD (% mean diff) for columns 1,2,3, 4,5,6,7,9,10,11,12,16,17,22,35,40,41,46,57,58,59,60,61,62, 63 because error mean square=0.

| Crop Type, Code | | | C NIOTA | C NIOTA | C NIOTA | C NIOTA | C NIOTA |
|---|---|---|---|---|---|---|---|
| BBCH Scale | | | BDIC | BDIC | BDIC | BDIC | BDIC |
| Crop Scientific Name | | | Nicotiana taba> | Nicotiana taba> | Nicotiana taba> | Nicotiana taba> | Nicotiana taba> |
| Crop Name | | | Virginian toba> | Virginian toba> | Virginian toba> | Virginian toba> | Virginian toba> |
| Crop Variety | | | C4M | C4M | C4M | C4M | C4M |
| Description | | | level 3 | level 4 | number of regr> | level 1 | level 2 |
| Rating Date | | | 26 Jul. 2019 | 26 Jul. 2019 | 2 Aug. 2019 | 2 Aug. 2019 | 2 Aug. 2019 |
| SE Group No. | | | 78 | 79 | 80 | 81 | 82 |
| Part Rated | | | PLANT C | PLANT C | PLANT C | PLANT C | PLANT C |
| Rating Type | | | REGROW | REGROW | COPLPA | REGROW | REGROW |
| Rating Unit | | | NUMBER | NUMBER | NUMBER | NUMBER | NUMBER |
| Sample Size | | | 1 PLOT | 1 PLOT | 1 PLOT | 1 PLOT | 1 PLOT |
| Collection Basis | | | 1 PLOT | 1 PLOT | 1 PLOT | 1 PLOT | 1 PLOT |
| Reporting Basis | | | 1 PLOT | 1 PLOT | 1 PLOT | 1 PLOT | 1 PLOT |
| Number of Subsamples | | | 1 | 1 | 1 | 1 | 1 |
| Crop Stage Scale | | | BBCH | BBCH | BBCH | BBCH | BBCH |
| Crop Stage Majority | | | 62 | 62 | 65 | 65 | 65 |
| Crop Stage Minimum/Maximum | | | 61 63 | 61 63 | 64 67 | 64 67 | 64 67 |
| Crop Density | | | 35 PLANT | 35 PLANT | 35 PLANT | 35 PLANT | 35 PLANT |
| Footnote Number | | | 4 | 5 | 1 | 2 | 3 |
| Assessed By | | | Moreno, J. | Moreno, J. | Moreno, J. | Moreno, J. | Moreno, J. |
| Days After First/Last Applic. | | | 7 7 | 7 7 | 14 14 | 14 14 | 14 14 |
| Trt-Eval Interval | | | 7 DA-A | 7 DA-A | 14 DA-A | 14 DA-A | 14 DA-A |
| ARM Action Codes | | | S05 | S05 | S05 | S05 | S05 |
| Number of Decimals | | | 2 | 2 | 2 | 2 | 2 |
| Trt No. | Treatment Name | Appl Code | 16* | 17* | 18* | 19* | 20* |
| 1 | Untreated Check | | 0.00- | 0.00- | 108.75a | 87.25a | 2.50a |
| 3 | 7DOT | | | | | | |
| 2 | 37DOT | AB | 0.00- | 0.00- | 1.25b | 1.25b | 0.00b |
| 3 | 37DOT | AB | 0.00- | 0.00- | 0.00b | 0.00b | 0.00b |
| 4 | 37DOT | AB | 0.00- | 0.00- | 0.00b | 0.00b | 0.00b |
| 5 | ANTAK 68.5 | AB | 0.00- | 0.00- | 0.00b | 0.00b | 0.00b |
| LSD P = Various | | | . | . | 2.100 | 2.980 | 0.398 |
| Standard Deviation | | | 0.000 | 0.000 | 1.363 | 1.934 | 0.258 |
| CV | | | 0.0 | 0.0 | 6.2 | 10.93 | 51.64 |
| Levene's F | | | 0.00 | 0.00 | 7.75 | 9.083 | 0.00 |
| Levene's Prob(F) | | | . | . | 0.001* | 0.001* | . |
| Skewness | | | . | . | 1.6268* | 1.6327* | 1.8118* |
| Kurtosis | | | . | . | 0.7137 | 0.7481 | 1.7386 |

-continued

| | | | | | |
|---|---|---|---|---|---|
| Mean Sep. Test | SNK.05 | SNK.05 | SNK.05 | SNK.05 | SNK.05 |
| Replicate F | 0.000 | 0.000 | 0.933 | 0.944 | 1.000 |
| Replicate Prob(F) | 1.0000 | 1.0000 | 0.4549 | 0.4498 | 0.4262 |
| Treatment F | 0.000 | 0.000 | 5062.669 | 1616.305 | 75.000 |
| Treatment Prob(F) | 1.0000 | 1.0000 | 0.0001 | 0.0001 | 0.0001 |

Means followed by same letter or symbol do not significantly differ

Mean comparisons performed only when AOV Treatment P(F) is significant at mean comparison OSL.

*Adjusted means

Could not calculate LSD (% mean diff) for columns 1, 2, 3, 4, 5, 6, 7, 9, 10, 11, 12, 16, 17, 22, 35, 40, 41, 46, 57, 58, 59, 60, 61, 62, 63 because error mean square = 0.

| Crop Type, Code | | | C NIOTA | C NIOTA | C NIOTA | C NIOTA | C NIOTA |
|---|---|---|---|---|---|---|---|
| BBCH Scale | | | BDIC | BDIC | BDIC | BDIC | BDIC |
| Crop Scientific Name | | | Nicotiana taba> | Nicotiana taba> | Nicotiana taba> | Nicotiana taba> | Nicotiana taba> |
| Crop Name | | | Virginian toba> | Virginian toba> | Virginian toba> | Virginian toba> | Virginian toba> |
| Crop Variety | | | C4M | C4M | C4M | C4M | C4M |
| Description | | | level 3 | level 4 | number of regr> | level 1 | level 2 |
| Rating Date | | | 2 Aug. 2019 | 2 Aug. 2019 | 9 Aug. 2019 | 9 Aug. 2019 | 9 Aug. 2019 |
| SE Group No. | | | 83 | 84 | 85 | 85 | 85 |
| Part Rated | | | PLANT C | PLANT C | PLANT C | PLANT C | PLANT C |
| Rating Type | | | REGROW | REGROW | COPLPA | REGROW | REGROW |
| Rating Unit | | | NUMBER | NUMBER | NUMBER | NUMBER | NUMBER |
| Sample Size | | | 1 PLOT | 1 PLOT | 1 PLOT | 1 PLOT | 1 PLOT |
| Collection Basis | | | 1 PLOT | 1 PLOT | 1 PLOT | 1 PLOT | 1 PLOT |
| Reporting Basis | | | 1 PLOT | 1 PLOT | 1 PLOT | 1 PLOT | 1 PLOT |
| Number of Subsamples | | | 1 | 1 | 1 | 1 | 1 |
| Crop Stage Scale | | | BBCH | BBCH | BBCH | BBCH | BBCH |
| Crop Stage Majority | | | 65 | 65 | 93 | 93 | 93 |
| Crop Stage Minimum/Maximum | | | 64 67 | 64 67 | 85 95 | 85 95 | 85 95 |
| Crop Density | | | 35 PLANT | 35 PLANT | 35 PLANT | 35 PLANT | 35 PLANT |
| Footnote Number | | | 4 | 5 | 1 | 2 | 3 |
| Assessed By | | | Moreno, J. | Moreno, J. | Moreno, J. | Moreno, J. | Moreno, J. |
| Days After First/Last Applic. | | | 14 14 | 14 14 | 21 21 | 21 21 | 21 21 |
| Trt-Eval Interval | | | 14 DA-A | 14 DA-A | 21 DA-A | 21 DA-A | 21 DA-A |
| ARM Action Codes | | | S05 | S05 | S05 | S05 | S05 |
| Number of Decimals | | | 2 | 2 | 2 | 2 | 2 |
| Trt No. | Treatment Name | Appl Code | 21* | 22* | 23* | 24* | 25* |
| 1 | Untreated Check | | 19.00a | 0.00- | 108.75a | 86.00a | 2.00a |
| 2 | 37DOT | AB | 0.00b | 0.00- | 1.25b | 0.00b | 1.25ab |
| 3 | 37DOT | AB | 0.00b | 0.00- | 0.00b | 0.00b | 0.00b |
| 4 | 37DOT | AB | 0.00b | 0.00- | 0.00b | 0.00b | 0.00b |
| 5 | ANTAK 68.5 | AB | 0.00b | 0.00- | 0.50b | 0.50b | 0.00b |
| LSD P = Various | | | 0.563 | | 2.210 | 2.977 | 1.071 |
| Standard Deviation | | | 0.365 | 0.000 | 1.435 | 1.932 | 0.695 |
| CV | | | 9.61 | 0.0 | 6.49 | 11.17 | 106.96 |
| Levene's F | | | 3.00 | 0.00 | 7.15 | 6.375 | 3.00 |
| Levene's Prob(F) | | | 0.053 | . | 0.002* | 0.003* | 0.053 |
| Skewness | | | 1.6315* | . | 1.6267* | 1.6331* | 2.0502* |
| Kurtosis | | | 0.7379 | . | 0.7136 | 0.7481 | 4.7854* |
| Mean Sep. Test | | | SNK.05 | SNK.05 | SNK.05 | SNK.05 | SNK.05 |
| Replicate F | | | 1.000 | 0.000 | 0.615 | 0.732 | 0.655 |
| Replicate Prob(F) | | | 0.4262 | 1.0000 | 0.6181 | 0.5525 | 0.5950 |
| Treatment F | | | 2166.000 | 0.000 | 4560.158 | 1580.304 | 7.138 |
| Treatment Prob(F) | | | 0.0001 | 1.0000 | 0.0001 | 0.0001 | 0.0035 |

Means followed by same letter or symbol do not significantly differ

Mean comparisons performed only when AOV Treatment P(F) is significant at mean comparison OSL.

*Adjusted means

Could not calculate LSD (% mean diff) for columns 1, 2, 3, 4, 5, 6, 7, 9, 10, 11, 12, 16, 17, 22, 35, 40, 41, 46, 57, 58, 59, 60, 61, 62, 63 because error mean square = 0.

| Crop Type, Code | C NIOTA | C NIOTA | C NIOTA | C NIOTA | C NIOTA |
|---|---|---|---|---|---|
| BBCH Scale | BDIC | BDIC | BDIC | BDIC | BDIC |
| Crop Scientific Name | Nicotiana taba> | Nicotiana taba> | Nicotiana taba> | Nicotiana taba> | Nicotiana taba> |
| Crop Name | Virginian toba> | Virginian toba> | Virginian toba> | Virginian toba> | Virginian toba> |
| Crop Variety | C4M | C4M | C4M | C4M | C4M |
| Description | level 3 | level 4 | number of regr> | level 1 | level 2 |
| Rating Date | 9 Aug. 2019 | 9 Aug. 2019 | 30 Aug. 2019 | 30 Aug. 2019 | 30 Aug. 2019 |
| SE Group No. | 85 | 85 | 86 | 86 | 86 |
| Part Rated | PLANT C | PLANT C | PLANT C | PLANT C | PLANT C |
| Rating Type | REGROW | REGROW | COPLPA | REGROW | REGROW |
| Rating Unit | NUMBER | NUMBER | NUMBER | NUMBER | NUMBER |
| Sample Size | 1 PLOT | 1 PLOT | 1 PLOT | 1 PLOT | 1 PLOT |
| Collection Basis | 1 PLOT | 1 PLOT | 1 PLOT | 1 PLOT | 1 PLOT |
| Reporting Basis | 1 PLOT | 1 PLOT | 1 PLOT | 1 PLOT | 1 PLOT |
| Number of Subsamples | 1 | 1 | 1 | 1 | 1 |
| Crop Stage Scale | BBCH | BBCH | BBCH | BBCH | BBCH |
| Crop Stage Majority | 93 | 193 | 93 | 93 | 93 |
| Crop Stage Minimum/Maximum | 85 95 | 85 95 | 85 95 | 85 95 | 85 95 |
| Crop Density | 35 PLANT | 35 PLANT | 35 PLANT | 35 PLANT | 35 PLANT |
| Footnote Number | 4 | 5 | 1 | 2 | 3 |
| Assessed By | Moreno, J. | Moreno, J. | Moreno, J. | Moreno, J. | Moreno, J. |
| Days After First/Last Applic. | 21 21 | 21 21 | 42 42 | 42 42 | 42 42 |
| Trt-Eval Interval | 21 DA-A | 21 DA-A | 42 DA-A | 42 DA-A | 42 DA-A |
| ARMAction Codes | S05 | S05 | S05 | S05 | S05 |
| Number of Decimals | 2 | 2 | 2 | 2 | 2 |

| Trt No. | Treatment Name | Appl Code | 26* | 27* | 28* | 29* | 30* |
|---|---|---|---|---|---|---|---|
| 1 | Untreated Check | | 2.50a | 18.25a | 108.75a | 86.00a | 0.00c |
| 2 | 37DOT | AB | 0.00b | 0.00b | 4.00b | 2.75b | 0.00c |
| 3 | 37DOT | AB | 0.00b | 0.00b | 3.00b | 2.00b | 0.75ab |
| 4 | 37DOT | AB | 0.00b | 0.00b | 2.50b | 2.00b | 0.25bc |
| 5 | ANTAK 68.5 | AB | 0.00b | 0.00b | 3.00b | 2.00b | 1.00a |
| | LSD P = Various | | 0.689 | 1.420 | 2.698 | 3.322 | 0.545 |
| | Standard Deviation | | 0.447 | 0.922 | 1.751 | 2.156 | 0.354 |
| | CV | | 89.44 | 25.26 | 7.22 | 11.38 | 88.39 |
| | Levene's F | | 1.00 | 49.00 | 2.936 | 3.646 | 0.75 |
| | Levene's Prob(F) | | 0.438 | 0.001* | 0.056 | 0.029* | 0.573 |
| | Skewness | | 2.2393* | 1.6717* | 1.6257* | 1.6319* | 0.4421 |
| | Kurtosis | | 4.6565* | 0.9621 | 0.7126 | 0.748 | −2.018* |
| | Mean Sep. Test | | SNK.05 | SNK.05 | SNK.05 | SNK.05 | SNK.05 |
| | Replicate F | | 1.000 | 1.000 | 0.103 | 0.355 | 0.000 |
| | Replicate Prob(F) | | 0.4262 | 0.4262 | 0.9566 | 0.7866 | 1.0000 |
| | Treatment F | | 25.000 | 313.471 | 2910.816 | 1208.613 | 6.600 |
| | Treatment Prob(F) | | 0.0001 | 0.0001 | 0.0001 | 0.0001 | 0.0048 |

Means followed by same letter or symbol do not significantly differ

Mean comparisons performed only when AOV Treatment P(F) is significant at mean comparison OSL.

*Adjusted means

Could not calculate LSD (% mean diff) for columns 1, 2, 3, 4, 5, 6, 7, 9, 10, 11, 12, 16, 17, 22, 35, 40, 41, 46, 57, 58, 59, 60, 61, 62, 63 because error mean square = 0.

| Crop Type, Code | C NIOTA | C NIOTA | C NIOTA | C NIOTA | C NIOTA |
|---|---|---|---|---|---|
| BBCH Scale | BDIC | BDIC | BDIC | BDIC | BDIC |
| Crop Scientific Name | Nicotiana taba> | Nicotiana taba> | Nicotiana taba> | Nicotiana taba> | Nicotiana taba> |
| Crop Name | Virginian toba> | Virginian toba> | Virginian toba> | Virginian toba> | Virginian toba> |
| Crop Variety | C4M | C4M | C4M | C4M | C4M |
| Description | level 3 | level 4 | number of regr> | level 1 | level 2 |
| Rating Date | 30 Aug. 2019 | 30 Aug. 2019 | 6 Sep. 2019 | 6 Sep. 2019 | 6 Sep. 2019 |
| SE Group No. | 86 | 86 | 87 | 87 | 87 |
| Part Rated | PLANT C | PLANT C | PLANT C | PLANT C | PLANT C |
| Rating Type | REGROW | REGROW | COPLPA | REGROW | REGROW |
| Rating Unit | NUMBER | NUMBER | NUMBER | NUMBER | NUMBER |
| Sample Size | 1 PLOT | 1 PLOT | 1 PLOT | 1 PLOT | 1 PLOT |
| Collection Basis | 1 PLOT | 1 PLOT | 1 PLOT | 1 PLOT | 1 PLOT |

-continued

| | 1 PLOT | 1 PLOT | 1 PLOT | 1 PLOT | 1 PLOT |
|---|---|---|---|---|---|
| Reporting Basis Number of Subsamples | 1 | 1 | 1 | 1 | 1 |
| Crop Stage Scale | BBCH | BBCH | BBCH | BBCH | BBCH |
| Crop Stage Majority | 93 | 93 | 95 | 95 | 95 |
| Crop Stage Minimum/Maximum | 85 95 | 85 95 | 93 95 | 93 95 | 93 95 |
| Crop Density | 35 PLANT | 35 PLANT | 35 PLANT | 35 PLANT | 35 PLANT |
| Footnote Number | 4 | 5 | 1 | 2 | 3 |
| Assessed By | Moreno, J. | Moreno, J. | Moreno, J. | Moreno, J. | Moreno, J. |
| Days After First/Last Applic. | 42 42 | 42 42 | 49 7 | 49 7 | 49 7 |
| Trt-Eval Interval | 42 DA-A | 42 DA-A | 7 DA-B | 7 DA-B | 7 DA-B |
| ARM Action Codes | S05 | S05 | S05 | S05 | S05 |
| Number of Decimals | 2 | 2 | 2 | 2 | 2 |

| Trt No. | Treatment Name | Appl Code | 31* | 32* | 33* | 34* | 35* |
|---|---|---|---|---|---|---|---|
| 1 | Untreated Check | | 2.00a | 20.75a | 108.75a | 86.00a | 0.00- |
| 2 | 37DOT | AB | 1.25ab | 0.00b | 1.25b | 0.00b | 0.00- |
| 3 | 37DOT | AB | 0.25b | 0.00b | 1.00b | 0.00b | 0.00- |
| 4 | 37DOT | AB | 0.25b | 0.00b | 0.50b | 0.00b | 0.00- |
| 5 | ANTAK 68.5 | AB | 0.00b | 0.00b | 1.00b | 0.00b | 0.00- |
| | LSD P = Various | | 1.234 | 1.034 | 2.174 | 2.869 | . |
| | Standard Deviation | | 0.801 | 0.671 | 1.411 | 1.862 | 0.000 |
| | CV | | 106.81 | 16.16 | 6.27 | 10.82 | 0.0 |
| | Levene's F | | 1.643 | 25.00 | 5.603 | 6.75 | 0.00 |
| | Levene's Prob(F) | | 0.215 | 0.001* | 0.006* | 0.003* | . |
| | Skewness | | 1.883* | 1.644* | 1.6268* | 1.6334* | . |
| | Kurtosis | | 4.4596* | 0.8076 | 0.7139 | 0.7485 | . |
| | Mean Sep. Test | | SNK.05 | SNK.05 | SNK.05 | SNK.05 | SNK.05 |
| | Replicate F | | 0.286 | 1.000 | 1.105 | 1.000 | 0.000 |
| | Replicate Prob(F) | | 0.8348 | 0.4262 | 0.3853 | 0.4262 | 1.0000 |
| | Treatment F | | 4.481 | 765.445 | 4669.017 | 1706.769 | 0.000 |
| | Treatment Prob(F) | | 0.0191 | 0.0001 | 0.0001 | 0.0001 | 1.0000 |

Means followed by same letter or symbol do not significantly differ

Mean comparisons performed only when AOV Treatment P(F) is significant at mean comparison OSL.

*Adjusted means

Could not calculate LSD (% mean diff) for columns 1, 2, 3, 4, 5, 6, 7, 9, 10, 11, 12, 16, 17, 22, 35, 40, 41, 46, 57, 58, 59, 60, 61, 62, 63 because error mean square = 0.

| Crop Type, Code | C NIOTA | C NIOTA | C NIOTA | C NIOTA | C NIOTA |
|---|---|---|---|---|---|
| BBCH Scale | BDIC | BDIC | BDIC | BDIC | BDIC |
| Crop Scientific Name | Nicotiana taba> | Nicotiana taba> | Nicotiana taba> | Nicotiana taba> | Nicotiana taba> |
| Crop Name | Virginian toba> | Virginian toba> | Virginian toba> | Virginian toba> | Virginian toba> |
| Crop Variety Description | C4M level 3 | C4M level 4 | C4M number of regr> | C4M level 1 | C4M level 2 |
| Rating Date | 6 Sep. 2019 | 6 Sep. 2019 | 12 Sep. 2019 | 12 Sep. 2019 | 12 Sep. 2019 |
| SE Group No. | 87 | 87 | 88 | 88 | 88 |
| Part Rated | PLANT C | PLANT C | PLANT C | PLANT C | PLANT C |
| Rating Type | REGROW | REGROW | COPLPA | REGROW | REGROW |
| Rating Unit | NUMBER | NUMBER | NUMBER | NUMBER | NUMBER |
| Sample Size | 1 PLOT | 1 PLOT | 1 PLOT | 1 PLOT | 1 PLOT |
| Collection Basis | 1 PLOT | 1 PLOT | 1 PLOT | 1 PLOT | 1 PLOT |
| Reporting Basis | 1 PLOT | 1 PLOT | 1 PLOT | 1 PLOT | 1 PLOT |
| Number of Subsamples | 1 | 1 | 1 | 1 | 1 |
| Crop Stage Scale | BBCH | BBCH | BBCH | BBCH | BBCH |
| Crop Stage Majority | 195 | 195 | 95 | 95 | 95 |
| Crop Stage Minimum/Maximum | 93 95 | 93 95 | 93 95 | 93 95 | 93 95 |
| Crop Density | 35 PLANT | 35 PLANT | 35 PLANT | 35 PLANT | 35 PLANT |
| Footnote Number | 4 | 5 | 1 | 2 | 3 |
| Assessed By | Moreno, J. | Moreno, J. | Moreno, J. | Moreno, J. | Moreno, J. |
| Days After First/Last | 49 7 | 49 7 | 55 13 | 55 13 | 55 13 |
| Trt-Eval Interval | 7 DA-B | 7 DA-B | 13 DA-B | 13 DA-B | 13 DA-B |

-continued

| ARM Action Codes | | | S05 | S05 | S05 | S05 | S05 |
|---|---|---|---|---|---|---|---|
| Number of Decimals | | | 2 | 2 | 2 | 2 | 2 |
| Trt No | Treatment Name | Appl Code | 36* | 37* | 38 | 39* | 40* |
| 1 | Untreated Check | | 0.00c | 22.75a | 108.75a | 86.00a | 0.00- |
| 2 | 37DOT | AB | 1.25a | 0.00b | 4.00b | 2.75b | 0.00- |
| 3 | 37DOT | AB | 0.75abc | 0.25b | 2.75b | 1.75b | 0.00- |
| 4 | 37DOT | AB | 0.25bc | 0.25b | 1.75b | 1.25b | 0.00- |
| 5 | ANTAK 68.5 | AB | 1.00ab | 0.00b | 2.25b | 1.25b | 0.00- |
| LSD P = Various | | | 0.645 | 0.943 | 2.813 | 3.451 | . |
| Standard Deviation | | | 0.418 | 0.612 | 1.826 | 2.240 | 0.000 |
| CV | | | 64.36 | 13.17 | 7.64 | 12.04 | 0.0 |
| Levene's F | | | 0.50 | 1.324 | 4.50 | 3.714 | 0.00 |
| Levene's Prob(F) | | | 0.736 | 0.306 | 0.014* | 0.027* | . |
| Skewness | | | 0.2124 | 1.6317* | 1.6246* | 1.6304* | . |
| Kurtosis | | | −0.5518 | 0.7547 | 0.7107 | 0.7449 | . |
| Mean Sep. Test | | | SNK.05 | SNK.05 | SNK.05 | SNK.05 | SNK.05 |
| Replicate F | | | 0.286 | 1.556 | 0.100 | 0.319 | 0.000 |
| Replicate Prob(F) | | | 0.8348 | 0.2512 | 0.9585 | 0.8116 | 1.0000 |
| Treatment F | | | 6.143 | 1092.200 | 2700.660 | 1132.216 | 0.000 |
| Treatment Prob(F) | | | 0.0063 | 0.0001 | 0.0001 | 0.0001 | 1.0000 |

Means followed by same letter or symbol do not significantly differ

Mean comparisons performed only when AOV Treatment P(F) is significant at mean comparison OSL.

*Adjusted means

Could not calculate LSD (% mean diff) for columns 1, 2, 3, 4, 5, 6, 7, 9, 10, 11, 12, 16, 17, 22, 35, 40, 41, 46, 57, 58, 59, 60, 61, 62, 63 because error mean square = 0.

| Crop Type, Code | | | C NIOTA | C NIOTA | C NIOTA | C NIOTA | C NIOTA |
|---|---|---|---|---|---|---|---|
| BBCH Scale | | | BDIC | BDIC | BDIC | BDIC | BDIC |
| Crop Scientific Name | | | Nicotiana taba> | Nicotiana taba> | Nicotiana taba> | Nicotiana taba> | Nicotiana taba> |
| Crop Name | | | Virginian toba> | Virginian toba> | Virginian toba> | Virginian toba> | Virginian toba> |
| Crop Variety | | | C4M | C4M | C4M | C4M | C4M |
| Description | | | level 3 | level 4 | number of regr> | level 1 | level 2 |
| Rating Date | | | 12 Sep. 2019 | 12 Sep. 2019 | 20 Sep. 2019 | 20 Sep. 2019 | 20 Sep. 2019 |
| SE Group No. | | | 88 | 88 | 89 | 89 | 89 |
| Part Rated | | | PLANT C | PLANT C | PLANT C | PLANT C | PLANT C |
| Rating Type | | | REGROW | REGROW | COPLPA | REGROW | REGROW |
| Rating Unit | | | NUMBER | NUMBER | NUMBER | NUMBER | NUMBER |
| Sample Size | | | 1 PLOT | 1 PLOT | 1 PLOT | 1 PLOT | 1 PLOT |
| Collection Basis | | | 1 PLOT | 1 PLOT | 1 PLOT | 1 PLOT | 1 PLOT |
| Reporting Basis | | | 1 PLOT | 1 PLOT | 1 PLOT | 1 PLOT | 1 PLOT |
| Number of Subsamples | | | 1 | 1 | 1 | 1 | 1 |
| Crop Stage Scale | | | BBCH | BBCH | BBCH | BBCH | BBCH |
| Crop Stage Majority | | | 95 | 95 | 95 | 95 | 95 |
| Crop Stage Minimum/Maximum | | | 93 95 | 93 95 | 93 95 | 93 95 | 93 95 |
| Crop Density | | | 35 PLANT | 35 PLANT | 35 PLANT | 35 PLANT | 35 PLANT |
| Footnote Number | | | 4 | 5 | 1 | 2 | 3 |
| Assessed By | | | Moreno, J. | Moreno, J. | Moreno, J. | Moreno, J. | Moreno, J. |
| Days After First/Last Applic. | | | 55 13 | 55 13 | 63 21 | 63 21 | 63 21 |
| Trt-Eval Interval | | | 13 DA-B | 13 DA-B | 21 DA-B | 21 DA-B | 21 DA-B |
| ARM Action Codes | | | S05 | S05 | S05 | S05 | S05 |
| Number of Decimals | | | 2 | 2 | 2 | 2 | 2 |
| Trt No. | Treatment Name | Appl Code | 41* | 42* | 43* | 44* | 45* |
| 1 | Untreated Check | | 0.00- | 22.75a | 108.75a | 86.00a | 0.00b |
| 2 | 37DOT | AB | 0.00- | 1.25b | 11.75b | 7.75b | 2.75a |
| 3 | 37DOT | AB | 0.00- | 1.00b | 9.75b | 7.00b | 1.75ab |
| 4 | 37DOT | AB | 0.00- | 0.50b | 7.00b | 5.25b | 1.25ab |
| 5 | ANTAK 68.5 | AB | 0.00- | 1.00b | 9.50b | 6.75b | 1.75ab |
| LSD P = Various | | | . | 1.151 | 4.074 | 3.797 | 1.488 |
| Standard Deviation | | | 0.000 | 0.747 | 2.644 | 2.465 | 0.966 |
| CV | | | 0.0 | 14.1 | 9.01 | 10.93 | 64.41 |

-continued

| | | | | | |
|---|---|---|---|---|---|
| Levene's F | 0.00 | 1.083 | 0.479 | 1.738 | 2.85 |
| Levene's Prob(F) | . | 0.40 | 0.751 | 0.194 | 0.061 |
| Skewness | . | 1.6237* | 1.6135* | 1.6258* | 1.0944* |
| Kurtosis | . | 0.7454 | 0.6937 | 0.7422 | 1.515 |
| Mean Sep. Test | SNK.05 | SNK.05 | SNK.05 | SNK.05 | SNK.05 |
| Replicate F | 0.000 | 1.075 | 0.541 | 0.623 | 1.357 |
| Replicate Prob(F) | 1.0000 | 0.3966 | 0.6632 | 0.6137 | 0.3026 |
| Treatment F | 0.000 | 682.254 | 1128.747 | 828.918 | 4.286 |
| Treatment Prob(F) | 1.0000 | 0.0001 | 0.0001 | 0.0001 | 0.0221 |

Means followed by same letter or symbol do not significantly differ

Mean comparisons performed only when AOV Treatment P(F) is significant at mean comparison OSL.

*Adjusted means

Could not calculate LSD (% mean diff) for columns 1, 2, 3, 4, 5, 6, 7, 9, 10, 11, 12, 16, 17, 22, 35, 40, 41, 46, 57, 58, 59, 60, 61, 62, 63 because error mean square = 0.

| Crop Type, Code | C NIOTA | C NIOTA | C NIOTA | C NIOTA | C NIOTA |
|---|---|---|---|---|---|
| BBCH Scale | BDIC | BDIC | BDIC | BDIC | BDIC |
| Crop Scientific Name | Nicotiana taba> | Nicotiana taba> | Nicotiana taba> | Nicotiana taba> | Nicotiana taba> |
| Crop Name | Virginian toba> | Virginian toba> | Virginian toba> | Virginian toba> | Virginian toba> |
| Crop Variety | C4M | C4M | C4M | C4M | C4M |
| Description | level 3 | level 4 | | | |
| Rating Date | 20 Sep. 2019 | 20 Sep. 2019 | 19 Aug. 2019 | 6 Sep. 2019 | 24 Sep. 2019 |
| SE Group No. | 89 | 89 | 90 | 91 | 92 |
| Part Rated | PLANT C | PLANT C | PLANT C | PLANT C | PLANT C |
| Rating Type | REGROW | REGROW | YIELD | YIELD | YIELD |
| Rating Unit | NUMBER | NUMBER | kg/ha | kg/ha | kg/ha |
| Sample Size | 1 PLOT | 1 PLOT | 1 PLOT | 1 PLOT | 1 PLOT |
| Collection Basis | 1 PLOT | 1 PLOT | 1 PLOT | 1 PLOT | 1 PLOT |
| Reporting Basis | 1 PLOT | 1 PLOT | 1 PLOT | 1 PLOT | 1 PLOT |
| Number of Subsamples | 1 | 1 | 1 | 1 | 1 |
| Crop Stage Scale | BBCH | BBCH | BBCH | BBCH | BBCH |
| Crop Stage Majority | 95 | 95 | 95 | 95 | 95 |
| Crop Stage Minimum/Maximum | 93 95 | 93 95 | 93 95 | 93 95 | 93 95 |
| Crop Density | 35 PLANT | 35 PLANT | 35 PLANT | 35 PLANT | 35 PLANT |
| Footnote Number | 4 | 5 | 6 | 7 | 8 |
| Assessed By | Moreno, J. | Moreno, J. | Moreno, J. | Moreno, J. | Moreno, J. |
| Days After First/Last Applic. | 63 21 | 63 21 | 31 31 | 49 7 | 67 25 |
| Trt-Eval Interval | 21 DA-B | 21 DA-B | 31 DA-A | 7 DA-B | 25 DA-B |
| ARM Action Codes | S05 | S05 | S05 | S05 | S05 |
| Number of Decimals | 2 | 2 | 2 | 2 | 2 |

| No Trt | Name Treatment | Appl Code | 46* | 47* | 48* | 49* | 50* |
|---|---|---|---|---|---|---|---|
| 1 | Untreated Check | | 0.00- | 22.75a | 5357.07b | 3354.15c | 5584.83c |
| 2 | 37DOT | AB | 0.00- | 1.25b | 6785.62a | 5123.63b | 7511.87b |
| 3 | 37DOT | AB | 0.00- | 1.00b | 7113.00a | 6498.65a | 10936.85a |
| 4 | 37DOT | AB | 0.00- | 0.50b | 7232.05a | 6786.98a | 12593.72a |
| 5 | ANTAK 68.5 | AB | 0.00- | 1.00b | 6914.59a | 6278.20a | 12250.84a |
| | LSD P = Various | | . | 1.151 | 455.078 | 694.320 | 1915.717 |
| | Standard Deviation | | 0.000 | 0.747 | 295.380 | 450.666 | 1243.445 |
| | CV | | 0.0 | 14.1 | 4.42 | 8.04 | 12.72 |
| | Levene's F | | 0.00 | 1.083 | 0.19 | 0.707 | 1.302 |
| | Levene's Prob(F) | | . | 0.40 | 0.94 | 0.599 | 0.314 |
| | Skewness | | . | 1.6237* | −1.1835* | −0.9597 | −0.196 |
| | Kurtosis | | . | 0.7454 | 0.2574 | −0.4385 | 1.1658 |
| | Mean Sep. Test | | SNK.05 | SNK.05 | SNK.05 | SNK.05 | SNK.05 |
| | Replicate F | | 0.000 | 1.075 | 0.044 | 0.240 | 2.179 |
| | Replicate Prob(F) | | 1.0000 | 0.3966 | 0.9870 | 0.8668 | 0.1434 |
| | Treatment F | | 0.000 | 682.254 | 26.459 | 39.128 | 24.644 |
| | Treatment Prob(F) | | 1.0000 | 0.0001 | 0.0001 | 0.0001 | 0.0001 |

Means followed by same letter or symbol do not significantly differ

Mean comparisons performed only when AOV Treatment P(F) is significant at mean comparison OSL.

*Adjusted means

Could not calculate LSD (% mean diff) for columns 1, 2, 3, 4, 5, 6, 7, 9, 10, 11, 12, 16, 17, 22, 35, 40, 41, 46, 57, 58, 59, 60, 61, 62, 63 because error mean square = 0.

| Crop Type, Code | C NIOTA | C NIOTA | C NIOTA | C NIOTA | C NIOTA |
|---|---|---|---|---|---|
| BBCH Scale | BDIC | BDIC | BDIC | BDIC | BDIC |
| Crop Scientific Name | Nicotiana taba> | Nicotiana taba> | Nicotiana taba> | Nicotiana taba> | Nicotiana taba> |
| Crop Name | Virginian toba> | Virginian toba> | Virginian toba> | Virginian toba> | Virginian toba> |
| Crop Variety | C4M | C4M | C4M | C4M | C4M |
| Description | ACCUMULATED | | | | ACCUMULATED |
| Rating Date | 24 Sep. 2019 | 2 Sep. 2019 | 16 Sep. 2019 | 4 Oct. 2019 | 4 Oct. 2019 |
| SE Group No. | 92 | 90 | 91 | 92 | 92 |
| Part Rated | PLANT C | PLANT C | PLANT C | PLANT C | PLANT C |
| Rating Type | YIELD | YIELD | YIELD | YIELD | YIELD |
| Rating Unit | kg/ha | kg/ha | kg/ha | kg/ha | kg/ha |
| Sample Size | 1 PLOT | 1 PLOT | 1 PLOT | 1 PLOT | 1 PLOT |
| Collection Basis | 1 PLOT | 1 PLOT | 1 PLOT | 1 PLOT | 1 PLOT |
| Reporting Basis | 1 PLOT | 1 PLOT | 1 PLOT | 1 PLOT | 1 PLOT |
| Number of Subsamples | 1 | 1 | 1 | 1 | 1 |
| Crop Stage Scale | BBCH | BBCH | BBCH | BBCH | BBCH |
| Crop Stage Majority | 195 | 95 | 95 | 95 | 95 |
| Crop Stage Minimum/Maximum | 93 95 | 93 95 | 93 95 | 93 95 | 93 95 |
| Crop Density | 35 PLANT | 35 PLANT | 35 PLANT | 35 PLANT | 35 PLANT |
| Footnote Number | | 9 | 10 | 11 | |
| Assessed By | Moreno, J. | Moreno, J. | Moreno, J. | Moreno, J. | Moreno, J. |
| Days After First/Last Applic. | 67 25 | 45 3 | 59 17 | 77 35 | 77 35 |
| Trt-Eval Interval | 25 DA-B | 3 DA-B | 17 DA-B | 35 DA-B | 35 DA-B |
| ARM Action Codes | T1 S05 | S05 | S05 | S05 | T2 S05 |
| Number of Decimals | 2 | 2 | 2 | 2 | 2 |

| Trt No. | Treatment Name | Appl Code | 51* | 52* | 53* | 54* | 55* |
|---|---|---|---|---|---|---|---|
| 1 | Untreated Check | | 14296.05c | 630.10b | 468.80c | 979.84c | 2078.74c |
| 2 | 37DOT | AB | 19421.12b | 800.51a | 752.38b | 1443.95b | 2996.83b |
| 3 | 37DOT | AB | 24548.50a | 795.62a | 899.18ab | 1986.21a | 3681.01a |
| 4 | 37DOT | AB | 26612.74a | 876.06a | 959.19a | 2233.80a | 4069.05a |
| 5 | ANTAK 68.5 | AB | 25443.63a | 810.74a | 877.68ab | 2158.11a | 3846.52a |
| LSD P = Various | | | 2469.394 | 100.128 | 128.237 | 405.151 | 479.743 |
| Standard Deviation | | | 1602.822 | 64.991 | 83.236 | 262.974 | 311.389 |
| CV | | | 7.26 | 8.3 | 10.52 | 14.94 | 9.34 |
| Levene's F | | | 0.997 | 0.528 | 0.635 | 0.111 | 0.247 |
| Levene's Prob(F) | | | 0.439 | 0.717 | 0.645 | 0.977 | 0.907 |
| Skewness | | | −0.6672 | −0.6329 | −0.9188 | −0.1355 | −0.5915 |
| Kurtosis | | | −0.7814 | −0.8727 | −0.4847 | −0.5868 | −0.4249 |
| Mean Sep. Test | | | SNK.05 | SNK.05 | SNK.05 | SNK.05 | SNK.05 |
| Replicate F | | | 1.641 | 0.834 | 0.377 | 2.189 | 1.488 |
| Replicate Prob(F) | | | 0.2321 | 0.5009 | 0.7715 | 0.1422 | 0.2676 |
| Treatment F | | | 41.109 | 7.877 | 22.056 | 16.523 | 26.946 |
| Treatment Prob(F) | | | 0.0001 | 0.0024 | 0.0001 | 0.0001 | 0.0001 |

Means followed by same letter or symbol do not significantly differ

Mean comparisons performed only when AOV Treatment P(F) is significant at mean comparison OSL.

*Adjusted means

Could not calculate LSD (% mean diff) for columns 1, 2, 3, 4, 5, 6, 7, 9, 10, 11, 12, 16, 17, 22, 35, 40, 41, 46, 57, 58, 59, 60, 61, 62, 63 because error mean square = 0.

| Crop Type, Code | C NIOTA | C NIOTA | C NIOTA | C NIOTA | C NIOTA |
|---|---|---|---|---|---|
| BBCH Scale | BDIC | BDIC | BDIC | BDIC | BDIC |
| Crop Scientific Name | Nicotiana taba> | Nicotiana taba> | Nicotiana taba> | Nicotiana taba> | Nicotiana taba> |
| Crop Name | Virginian toba> | Virginian toba> | Virginian toba> | Virginian toba> | Virginian toba> |
| Crop Variety | C4M | C4M | C4M | C4M | C4M |
| Description | | number of regr> | number of regr> | number of regr> | number of regr> |
| Rating Date | 9 Oct. 2019 | 26 Jul. 2019 | 2 Aug. 2019 | 9 Aug. 2019 | 30 Aug. 2019 |
| SE Group No. | 92 | 93 | 94 | 95 | 96 |
| Part Rated | PLANT C | PLANT C | PLANT C | PLANT C | PLANT C |
| Rating Type | QTIENT | CONTRO | CONTRO | CONTRO | CONTRO |
| Rating Unit | % | % | % | % | % |
| Sample Size | 1 PLOT | 1 PLOT | 1 PLOT | 1 PLOT | 1 PLOT |
| Collection Basis | 1 PLOT | 1 PLOT | 1 PLOT | 1 PLOT | 1 PLOT |
| Reporting Basis | 1 PLOT | 1 PLOT | 1 PLOT | 1 PLOT | 1 PLOT |

-continued

| | | | | | |
|---|---|---|---|---|---|
| Number of Subsamples | 1 | 1 | 1 | 1 | 1 |
| Crop Stage Scale | BBCH | BBCH | BBCH | BBCH | BBCH |
| Crop Stage Majority | 95 | 62 | 65 | 93 | 93 |
| Crop Stage Minimum/Maximum | 93 95 | 61 63 | 64 67 | 85 95 | 85 95 |
| Crop Density | 35 PLANT | 35 PLANT | 35 PLANT | 35 PLANT | 35 PLANT |
| Footnote Number | 12 | | | | |
| Assessed By | Moreno, J. | Moreno, J. | Moreno, J. | Moreno, J. | Moreno, J. |
| Days After First/Last Applic. | 82 40 | 7 7 | 14 14 | 21 21 | 42 42 |
| Trt-Eval Interval | 40 DA-B | 7 DA-A | 14 DA-A | 21 DA-A | 42 DA-A |
| ARM Action Codes | T3 S05 | @TTAB[13] | @TTAB[18] | @TTAB[23] | @TTAB[28] |
| Number of Decimals | 2 | 2 | 2 | 2 | 2 |

| Trt No. | Treatment Name | Appl Code | 56* | 57 | 58 | 59 | 60 |
|---|---|---|---|---|---|---|---|
| 1 | Untreated Check | | 14.54- | 0.00 | 0.00 | 0.00 | 0.00 |
| 2 | 37DOT | AB | 15.38- | 100.00 | 98.85 | 98.85 | 96.32 |
| 3 | 37DOT | AB | 15.03- | 100.00 | 100.00 | 100.00 | 97.24 |
| 4 | 37DOT | AB | 15.26- | 100.00 | 100.00 | 100.00 | 97.70 |
| 5 | ANTAK 68.5 | AB | 15.13- | 100.00 | 100.00 | 99.54 | 97.24 |
| LSD P = Various | | | 1.079 | . | . | . | . |
| Standard Deviation | | | 0.701 | . | . | . | . |
| CV | | | 4.65 | . | . | . | . |
| Levene's F | | | 0.937 | . | . | . | . |
| Levene's Prob(F) | | | 0.469 | . | . | . | . |
| Skewness | | | 1.3282* | . | . | . | . |
| Kurtosis | | | 1.4785 | . | . | . | . |
| Mean Sep. Test | | | SNK.05 | | | | |
| Replicate F | | | 1.208 | | | | |
| Replicate Prob(F) | | | 0.3490 | | | | |
| Treatment F | | | 0.849 | | | | |
| Treatment Prob(F) | | | 0.5208 | | | | |

Means followed by same letter or symbol do not significantly differ

Mean comparisons performed only when AOV Treatment P(F) is significant at mean comparison OSL.

*Adjusted means

Could not calculate LSD (% mean diff) for columns 1, 2, 3, 4, 5, 6, 7, 9, 10, 11, 12, 16, 17, 22, 35, 40, 41, 46, 57, 58, 59, 60, 61, 62, 63 because error mean square = 0.

| Crop Type, Code | C NIOTA | C NIOTA | C NIOTA |
|---|---|---|---|
| BBCH Scale | BDIC | BDIC | BDIC |
| Crop Scientific Name | Nicotiana taba> | Nicotiana taba> | Nicotiana taba> |
| Crop Name | Virginian toba> | Virginian toba> | Virginian toba> |
| Crop Variety | C4M | C4M | C4M |
| Description | number of regr> | number of regr> | number of regr> |
| Rating Date | 6 Sep. 2019 | 12 Sep. 2019 | 20 Sep. 2019 |
| SE Group No. | 97 | 98 | 99 |
| Part Rated | PLANT C | PLANT C | PLANT C |
| Rating Type | CONTRO | CONTRO | CONTRO |
| Rating Unit | % | % | % |
| Sample Size | 1 PLOT | 1 PLOT | 1 PLOT |
| Collection Basis | 1 PLOT | 1 PLOT | 1 PLOT |
| Reporting Basis | 1 PLOT | 1 PLOT | 1 PLOT |
| Number of Subsamples | 1 | 1 | 1 |
| Crop Stage Scale | BBCH | BBCH | BBCH |
| Crop Stage Majority | 95 | 95 | 95 |
| Crop Stage Minimum/Maximum | 93 95 | 93 95 | 93 95 |
| Crop Density | 35 PLANT | 35 PLANT | 35 PLANT |
| Footnote Number | | | |
| Assessed By | Moreno, J. | Moreno, J. | Moreno, J. |
| Days After First/Last Applic. | 49 7 | 55 13 | 63 21 |
| Trt-Eval Interval | 7 DA-B | 13 DA-B | 21 DA-B |

-continued

| ARM Action Codes Number of Decimals | | | @TTAB[33] 2 | @TTAB[38] 2 | @TTAB[43] 2 |
|---|---|---|---|---|---|
| Trt No. | Treatment Name | Appl Code | 61 | 62 | 63 |
| 1 | Untreated Check | | 0.00 | 0.00 | 0.00 |
| 2 | 37DOT | AB | 98.85 | 96.32 | 89.20 |
| 3 | 37DOT | AB | 199.08 | 97.47 | 91.03 |
| 4 | 37DOT | AB | 99.54 | 98.39 | 93.56 |
| 5 | ANTAK 68.5 | AB | 99.08 | 97.93 | 91.26 |
| LSD P = Various | | | | | |
| Standard Deviation | | | | | |
| CV | | | | | |
| Levene's F | | | | | |
| Levene's Prob(F) | | | | | |
| Skewness | | | | | |
| Kurtosis | | | | | |
| Mean Sep. Test | | | | | |
| Replicate F | | | | | |
| Replicate Prob(F) | | | | | |
| Treatment F | | | | | |
| Treatment Prob(F) | | | | | |

Means followed by same letter or symbol do not significantly differ

Mean comparisons performed only when AOV Treatment P(F) is significant at mean comparison OSL.

* Adjusted means

Could not calculate LSD (% mean diff) for columns 1, 2, 3, 4, 5, 6, 7, 9, 10, 11, 12, 16, 17, 22, 35, 40, 41, 46, 57, 58, 59, 60, 61, 62, 63 because error mean square = 0.

No phytotoxicity was observed during the length of the study. At the time of the first application, all plots showed level 1 axillary shoots. Seven days after the first application no axillary shoots were observed on treated plants, that is, inhibition was total with all treatments. Fourteen days after the first application, only the plants treated with 5% 37DOT had axillary shoots, which were all level 1. Twenty-one days after the first application, the plants treated with 6% and 7% 37DOT still had no axillary shoots, while new (level 1) shoots were observed on plants treated with 4% ANTAK 68.5. Level 2 shoots were observed on plants treated with 5% 37DOT due to continued growth of the previously observed shoots, but no new shoots appeared.

On the day of the second application, all of the previously treated plants were observed to have axillary shoots of levels 1 to 3. Seven days after the second application, none of the treated plants were observed to have shoots of levels 1 or 2, that is inhibition was total, but all treated plants were observed to have shoots of levels 3 and 4. However, by thirteen days after the second application, all treated plants were observed to have axillary shoots of levels 1 and 4, but not levels 2 or 3. At twenty-one days after the second application, all treated plants were observed to have axillary shoots of levels 1, 2, and 4, but not level 3. Therefore, the efficacy of the treatments appeared to decrease, as new axillary shoots were observed with all treatments at both 13 and 21 days after the second application.

Thirty-one days after the first application, the yield was highest from the plants treated with 6% and 7% 37DOT. Thirty-five days after the second application plants treated with 7% 37DOT had the highest yield, followed by (in order of decreasing yield) plants treated with 4% ANTAK 68.5, 6% 37DOT, 5% 37DOT, and untreated plants. All plots treated with 37DOT and ANTAK 68.5 reached higher yield of fresh and dry tobacco than untreated plots, obtaining significant statistical differences.

Example 3: Additional Effectiveness of Various Axillary Bud Inhibitors

A third study was conducted comparing the effects of various treatment compositions on TH241 tobacco. The study was designed in random blocks. Each test plot was formed by two rows of ten tobacco plants. Each treatment was applied to three separate plots. Test plots received irrigation at regular intervals throughout the study period. The first application was performed when the first axillary shoots were observed. Additional applications were performed when new axillary shoots were observed. Shoots longer than 3 cm were manually removed at the time of each application. The applications were performed using a manual backpack sprayer, spraying at a low pressure above the plant toward the stalk so that the composition ran down the stalk, contacting the leaf axils. Approximately 13 to 26 milliliters of composition were applied to each plant. The phytotoxicity of the treatment compositions was assessed and recorded on a scale of 0 to 5 based on visible symptoms. The number and size of the axil shoots was recorded every 7 to 14 days following the initial treatment application. Axillary shoots were assigned a level according to their length. Shoots less than 3 cm in length were assigned to level 1. Shoots between 3 and 15 cm were assigned to level 2. Shoots between 15 and 30 cm were assigned to level 3. Shoots between 30 and 45 cm were assigned to level 4. Shoots between 45 and 60 cm were assigned to level 5. And shoots greater than 60 cm were assigned to level 6. An estimated average length of shoots in each plot could then be calculated according to the number of shoots assigned to each level.

A record of the treatments tested and their respective application schedules is shown in Table 8 below.

TABLE 8

Application Summary

| Trt. No. | Appl. No. | Active matter | Treatment product | Dosage (%) | Application time |
|---|---|---|---|---|---|
| 1 | 1st | Pelargonic acid 68% EC | BELOUKHA | 1.5 | Sprouting |
| | 2nd | Pelargonic acid 68% EC | BELOUKHA | 1.5 | When buds come out (off-9 days) |
| | 3rd | Pelargonic acid 68% EC | BELOUKHA | 1.5 | When buds come out (off-26 days) |
| 2 | 1st | No data | BIOSUCKER | 5 | Sprouting |
| | 2nd | No data | BIOSUCKER | 5 | When buds come out (offtick + 43 days) |
| 3 | 1st | Sunflower oil | Generic | 20 | Sprouting |
| | 1st | Pine extract | RETENOL | 3 | Sprouting |
| | 1st | Soy lecithin | LISOPHOS | 3 | Sprouting |
| | 2nd | Sunflower oil | Generic | 20 | When buds come out (off-9 days) |
| | 2nd | Pine extract | RETENOL | 3 | When buds come out (off-9 days) |
| | 2nd | Soy lecithin | LISOPHOS | 3 | When buds come out (off-9 days) |
| | 3rd | Sunflower oil | Generic | 20 | When buds come out (highlight + 19 days) |
| | 3rd | Pine extract | RETENOL | 3 | When buds come out (highlight + 19 days) |
| | 3rd | Soy lecithin | LISOPHOS | 3 | When buds come out (highlight + 19 days) |
| 4 | 1st | No data | 5MHOT | 6 | Sprouting |
| | 2nd | No data | 5MHOT | 6 | When buds come out (off-9 days) |
| | 3rd | No data | 5MHOT | 6 | When buds come out (highlight + 19 days) |
| 5 | 1st | No data | 5MHCT | 6 | Sprouting |
| | 2nd | No data | 5MHCT | 6 | When buds come out (highlight + 19 days) |
| | 3rd | No data | 5MHOT | 6 | When buds come out (off-35 days) |
| 6 | 1st | No data | 37DCT | 5 | Sprouting |
| | 2nd | No data | 37DCT | 5 | When buds come out (offtick + 43 days) |
| 7 | 1st | No data | 37DOT | 5 | Sprouting |
| | 2nd | No data | 37DOT | 5 | When buds come out (offtick + 43 days) |
| 8 | 1st | Fatty alcohol 68.5% EC | ANTAK-68.5 | 4% | Sprouting |
| 9 | 1st | Fatty alcohol 68.5% EC | ANTAK-68.5 | 4% | Sprouting |
| | 1st | Pendimethalin 33% EC | SHARPEN 33% | 0.85% | Sprouting |
| 10 | | | Untreated control | | |

Phytotoxicity was assessed 9 days and 26 days after the first application of each treatment. At 9 days, the highest levels of burns and deformation were observed in leaves and axillary areas on the plants that received treatment 1, pelargonic acid, followed by those that received treatment 3, sunflower oil+pine extract+soy lecithin. Only mild symptoms of phytotoxicity were observed on the remaining plants. At day 26, only the plants treated with pelargonic acid were observed to have burns or deformations. The phytotoxicity was likely more apparent due to the fact that by day 26, two pelargonic acid treatments had already been performed. The remaining treatments showed no symptoms of phytotoxicity. On August 21, after a third application of pelargonic acid, symptoms of phytotoxicity were still more pronounced, with many axils exhibiting burns and leaves easily detached from the plant. No further evaluations were carried out. The results of the phytotoxicity assessments are shown in Table 9 below.

TABLE 9

Phytotoxicity Results

| Trt. No. | Treatment/Date | July 26 D + 9 days | August 12 D + 26 days |
|---|---|---|---|
| 1 | Pelargonic acid | 1.6 C | 2.0 B |
| 2 | Biosucker | 0.4 Ab | 0.0 To |
| 3 | Sunflower oil+ pine extract + soy lecithin | 0.9 Bc | 0.0 To |
| 4 | 5MHOT | 0.3 Ab | 0.0 To |
| 5 | 5MHCT | 0.1 To | 0.0 To |
| 6 | 37DCT | 0.1 Ab | 0.0 To |
| 7 | 37DOT | 0.2 Ab | 0.0 To |
| 8 | Fatty alcohol | 0.1 Ab | 0.0 To |
| 9 | Fatty alcohol + pendimethalin | 0.0 To | 0.0 To |
| 10 | Untreated control | 0.0 To | 0.0 To |
| | Significance level | A. Sig. | A. Sig. |

Treatments that differ in all their assigned letters are significantly different from the level of 5% or less The results of the length of axillary shoots measured are shown in Table 10 below. Throughout the study, whenever new axillary buds were observed in a plot, the treatment for that plot was applied again and shoots greater than 3 cm in length were manually removed. For this reason, treatments 1, 3, 4, and 5 were applied three times; treatments 2, 6, and 7 were applied twice; and treatments 8 and 9 were applied only once.

TABLE 10

Axillary Shoot Length Results

| Trt. No. | Treatment/ Date | 26-Jul D + 9 days | 5-Aug D + 19 days | 12-Aug D + 26 days | 21-Aug D + 35 days | 29-Aug D + 43 days |
|---|---|---|---|---|---|---|
| 1 | Pelargonic acid | 1.2 C | 1.3 Cd | 2.6 C | 1.2 Abc | 2.3 bcde |
| 2 | Biosucker | 0.1 To | 0.3 To | 0.6 Ab | 1.8 Bc | 3.4 Ef |
| 3 | Sunflower oil + pine extract + soy lecithin | 1.2 Bc | 1.5 D | 0.8 Ab | 1.9 Bc | 3.8 F |
| 4 | 5MHOT | 0.8 B | 1.1 Cd | 0.4 Ab | 1.3 Abc | 2.7 cdef |
| 5 | 5MHCT | 0.2 To | 0.7 Abc | 0.1 To | 0.9 Ab | 0.2 To |
| 6 | 37DCT | 0.1 To | 0.4 To | 0.5 0.1 | 1 Abc | 2.0 Bcd |
| 7 | 37DOT | 0.0 To | 0.1 To | 0.1 To | 0.6 To | 1.7 Bc |
| 8 | Fatty alcohol | 0.2 To | 0.6 Ab | 1.1 B | 2.1 C | 3.1 Def |
| 9 | Fatty alcohol + pendimethalin | 0.3 To | 0.5 Ab | 0.6 Ab | 0.7 Ab | 1.5 B |
| 10 | Untreated control | 2.0 D | 3.3 E | 4.1 D | 6.0 D | 6.0 G |
| | Significance level | A. Sig. | A. Sig. | A. Sig. | A. Sig. | A. Sig. |

| Trt. No. | Treatment/ Date | Sept. 11 D + 56 days | Sept. 24 D + 69 days | Sept. 30 D + 75 days | Oct. 10 D + 85 days |
|---|---|---|---|---|---|
| 1 | Pelargonic acid | 3.9 C | 5.1 C | 5.4 B | 5.5 B |
| 2 | Biosucker | 0.9 To | 2.6 Ab | 2.9 To | 4.9 Ab |
| 3 | Sunflower oil + pine extract + soy lecithin | 5.1 of | 5.6 C | 5.8 B | 5.9 B |

-continued

| Trt. No. | Treatment/ Date | Sept. 11 D + 56 days | Sept. 24 D + 69 days | Sept. 30 D + 75 days | Oct. 10 D + 85 days |
|---|---|---|---|---|---|
| 4 | 5MHOT | 4.1 Cd | 4.9 C | 5.0 B | 5.3 B |
| 5 | 5MHCT | 1.1 Ab | 2.1 Ab | 2.4 To | 3.8 Ab |
| 6 | 37DCT | 0.3 To | 1.8 To | 1.9 To | 2.7 To |
| 7 | 37DOT | 0.6 To | 2.0 Ab | 2.4 To | 3.6 Ab |
| 8 | Fatty alcohol | 4.4 Cd | 5.5 C | 5.7 B | 5.8 B |
| 9 | Fatty alcohol + pendimethalin | 2.2 B | 3.2 B | 3.3 To | 4.1 Ab |
| 10 | Untreated control | 6.0 E | 6.0 C | 6.0 B | 6.0 B |
| | Significance level | A. Sig. | A. Sig. | A. Sig. | A. Sig. |

Treatments that differ in all their assigned letters are significantly different from the level of 5% or less The plants in the untreated control group consistently produced larger shoots than the treated plants. At 9 days, the untreated plants had shoots of 3 to 15 cm in length. The shoots developed quickly, reaching an average length of 60 cm by day 35 of the study. This difference in shoot length of all treated and untreated plants was statistically significant at least through day 56 of the study. By day 69, the higher shoot length of untreated plants was no longer statistically significant when compared to plants that received treatments 1, 3, 4, and 8.

The fatty alcohol treatment and fatty alcohol+pendimethalin treatment performed similarly up to day 26 of the study, with shoots below 3 cm on average. Subsequently, the shoots of the fatty alcohol plots grew rapidly while those of the fatty alcohol+pendimethalin plots remained below 15 cm until day 56.

The best results were observed using the 37DCT and 37DOT treatments. After a single application of either 37DCT or 37DOT, shoots did not grow beyond 3 cm in length for at least 35 days. Similar results could only be obtained by treatment with fatty alcohol+pendimethalin. The Biosucker treatment kept shoots below 3 cm in length until at least 26 days after the shoots were first observed. Treatment with 5MHCT kept shoots below 3 cm in length until 19 days after the first application. The pelargonic acid, sunflower oil+pine extract+soy lecithin, and 5MHOT treatments resulted in shoots at or near 3 cm in length after only 9 days.

Even with multiple applications, most treatments underperformed the fatty alcohol+pendimethalin treatment by the end of the study. The 37DCT, 37DOT, and 5MHCT treatments, on the other hand, each resulted in smaller shoots than the alcohol+pendimethalin treatment on the last day of the study (although it should be noted that 37DCT and 37DOT were applied twice and 5MHCT was applied three times).

The effectiveness of each treatment method was calculated as compared to the non-treated control group. Table 11 below shows the results of the effectiveness calculation.

TABLE 11

Effectiveness Results

| Trt. No. | Treatment/Date | July 26 D + 9 days | Aug 5 D + 19 days | Aug 12 D + 26 days | Aug 21 D + 35 days | Aug 29 D + 43 days | Sept. 11 D + 56 days | Sept. 24 D + 69 days | Sept. 30 D + 75 days | Oct. 10 D + 85 days |
|---|---|---|---|---|---|---|---|---|---|---|
| 1 | Pelargonic acid | 39 | 61 | 37 | 80 | 61 | 35 | 16 | 9 | 8 |
| 2 | Biosucker | 97 | 91 | 86 | 70 | 44 | 86 | 57 | 52 | 19 |
| 3 | Sunflower oil + pine extract + soy lecithin | 43 | 53 | 81 | 68 | 37 | 15 | 7 | 3 | 1 |
| 4 | 5MHOT | 59 | 67 | 91 | 78 | 55 | 31 | 19 | 17 | 12 |
| 5 | 5MHCT | 93 | 80 | 97 | 86 | 96 | 82 | 66 | 60 | 36 |
| 6 | 37DCT | 94 | 89 | 88 | 83 | 67 | 95 | 70 | 69 | 55 |
| 7 | 37DOT | 100 | 98 | 98 | 90 | 72 | 90 | 67 | 60 | 40 |
| 8 | Fatty alcohol | 91 | 83 | 74 | 65 | 48 | 26 | 8 | 5 | 3 |
| 9 | FA + pendimethalin | 88 | 86 | 85 | 88 | 75 | 63 | 47 | 45 | 32 |
| 10 | Untreated control | 0 | 0 | 0 | 0 | 0 | 0 | 0 | 0 | 0 |

The effectiveness of the pelargonic acid, sunflower oil+pine extract+soy lecithin, and 5MHOT treatments was consistently below 80%, despite three applications being performed. The effectiveness of the Biosucker treatment was greater than 80% until day 26 of the study. After the second application, the effectiveness increased again but was not maintained.

The 5MHCT treatment demonstrated effectiveness of the three applications performed above 80% up to day 56 of the study. The initial application of the 37DCT and 37DOT treatments had an effectiveness greater than 80%, maintained through day 35. By performing the second application, effectiveness was increased and remained at or above 60% through day 75 of the study. The fatty alcohol treatment only maintained an effectiveness of more than 80% until day 19, while the fatty alcohol+pendimethalin treatment maintained an effectiveness above 80% until day 35.

Example 4: Additional Effectiveness of Various Axillary Bud Inhibitors

A fourth study was conducted simultaneously by two separate farms (designated Farm A and Farm B) to further assess the effectiveness of the various treatments including under varying conditions. The study conditions on the two farms are summarized in Table 12 below.

TABLE 12

Study Conditions Summary

| | Farm A | Farm B |
|---|---|---|
| Location | Rosalejo | El Matón/Collado de la Vera |
| Transplant date | May 18 | May 5 |
| Variety | PVH2310 | C-641 |
| Fertilizer (NPK UF) | 99-49-270 | 100-80-135 |
| Irrigation | Spraying, from June 20 to September 30, every 5 days | Spraying, from June 10 to October 5, every 4-5 days |
| Phytosanitary treatments | dichloropropene in April, s-metolachlor before transplanting deltamethrin at transplant suckercides at sprouting oxyfluorfen after packing | dichloropropene in April s-metolachlor 96% before transplanting suckercides at sprouting |
| Ancillary bud spouting dates | July 30 | July 31 |
| Collection dates | From August 26 to September 29, on 3 passes | From August 21 to October 23, on 3 passes |

The overall study was designed in random blocks. The treatments utilized were Biosucker, Bioantak (37 DOT), Antak-68.5, Beloukha, Sharpen 33%, and a control treatment that was untreated. On each farm, each test plot was formed by a single line of 20 plants. Each treatment was applied to three separate plots on each farm. Test plots received irrigation at regular intervals throughout the study period. The first application was applied when the first axillary shoots were observed. Additional applications were applied when the new axillary shoots were observed. Shoots longer than 3 cm were manually removed at the time of each application. The applications were performed using a manual backpack sprayer, spraying at a low pressure above the plant toward the stalk so that the composition ran down the stalk, contacting the leaf axils. Approximately 20 milliliters of composition were applied to each plant. The phytotoxicity of the treatment compositions was assessed and recorded on a scale of 0 to 5 based on visible symptoms. The number and size of the axil shoots was recorded every 6 to 8 days following the initial treatment application. As in example 3, axillary shoots were assigned a level according to their length. Shoots less than 3 cm in length were assigned to level 1. Shoots between 3 and 15 cm were assigned to level 2. Shoots between 15 and 30 cm were assigned to level 3. Shoots between 30 and 45 cm were assigned to level 4. Shoots between 45 and 60 cm were assigned to level 5. And shoots greater than 60 cm were assigned to level 6. An estimated average length of shoots in each plot could then be calculated according to the number of shoots assigned to each level.

A record of the treatments tested and their respective application schedules on both farms is shown in Table 13 below.

TABLE 13

Application Summary

| Trt. No. | Appl. No. | Active matter | Treatment product | Dosage (%) | Appl. time-Farm A | Appl. time-Farm B |
|---|---|---|---|---|---|---|
| 1 | 1st | No data | BIOSUCKER | 5 | 3 Aug, at sprouting | 3 Aug, at sprouting |
| | 2nd | No data | BIOSUCKER | 5 | 7 Sept, 35 days after sprouting | 7 Sept, 35 days after sprouting |
| 2 | 1st | No data | BIOSUCKER | 5 | Aug 3rd, sprouting | Aug 3rd, sprouting |
| | 2nd | No data | BIOSUCKER | 5 | 7 Sept, 35 days after sprouting | 7 Sept, 35 days after sprouting |
| | 3rd | No data | BIOSUCKER | 5 | Not applied | Not applied |
| 3 | 1st | 85% citronellol 15% Tween 80 | BIOANTAK (37DOT) | 7 | At sprouting | At sprouting |
| | 2nd | 85% citronellol 15% Tween 80 | BIOANTAK (37DOT) | 7 | 2 Sept, 34 days after sprouting | 2 Sept, 33 days after sprouting |
| 4 | 1st | 85% citronellol 15% Tween 180 | BIOANTAK (37DOT) | 7 | At sprouting | At sprouting |
| | 2nd | 85% citronellol 15% Tween 80 | BIOANTAK (37DOT) | 7 | 2 Sept, 34 days after sprouting | 2 Sept, 33 days after sprouting |
| | 3rd | 85% citronellol 15% Tween 80 | BIOANTAK (37DOT) | 7 | 23 Sept, 55 days after sprouting | Not applied |
| 5 | 1st | Fatty alcohol 68.5% EC | ANTAK-68.5 | 3 | At sprouting | At sprouting |
| | 1st | Pelargonic acid 68% EC | BELOUKHA | 1.75 | At sprouting | At sprouting |
| | 2nd | Fatty alcohol 68.5% EC | ANTAK-68.5 | 3 | 2 Sept, 34 days after sprouting | Aug 20, 20 days after sprouting |
| | 2nd | Pelargonic acid 68% EC | BELOUKHA | 1.75 | 2 Sept, 34 days after sprouting | Aug 20, 20 days after sprouting |
| 6 | 1st | Fatty alcohol 68.5% EC | ANTAK-68.5 | 4 | At sprouting | At sprouting |
| | 2nd | Fatty alcohol 68.5% EC | ANTAK-68.5 | 4 | Aug 15, 15 days after sprouting | Aug 14, 14 days after sprouting |
| | 3rd | Fatty alcohol 68.5% EC | ANTAK-68.5 | 4 | 2 Sept, 34 days after sprouting | 2 Sept, 33 days after sprouting |
| 7 | 1st | Fatty alcohol 68.5% EC | ANTAK-68.5 | 4 | At sprouting | At sprouting |
| | 2nd | Pendi-methalin 33% EC | SHARPEN 33% | 0.85 | At sprouting | At sprouting |
| 8 | | | Untreated control | | | |

Phytotoxicity was assessed 7 days after the first application of each treatment at Farm A and 6 days after the first application of each treatment at Farm B. At both farms, the highest levels of burns and deformation were observed in leaves and axillary areas on the plants that received treatment 5, pelargonic acid. No symptoms of phytotoxicity were observed on the remaining plants. Symptoms on the plants that received pelargonic acid became more severe later on in the study after further application of the treatment. The results of the phytotoxicity assessments are shown in Table 14 below.

TABLE 14

Phytotoxicity Results

| Treatment No. | Treatment/Date | Farm A D + 7 days | Farm B D + 6 days |
|---|---|---|---|
| 1 | BIOSUCKER sprouting and 35 days | 0 To | 0 To |
| 2 | BIOSUCKER sprouting and 35 days | 0 To | 0 To |
| 3 | BIOANTAK sprouting and 33-34 days | 0 To | 0 To |
| 4 | BIOANTAK sprouting, 33-34, and 55 days | 0 To | 0 To |
| 5 | FA + PELARGONIC sprouting and 20-34 days | 1 To | 1 To |
| 6 | FATTY ALCOHOL sprouting, 14-15, and 33-34 days | 0 To | 0 To |
| 7 | FA + PENDIMETHALIN sprouting | 0 To | 0 To |
| 8 | Untreated control | 0 To | 0 To |
| | Significance level | A. Sig. | A. Sig. |

Treatments that differ in all their assigned letters are significantly different from the level of 5% or less The results of the length of axillary shoots measured at Farm A and Farm B are shown in Table 15 and Table 16, respectively. Throughout the study, whenever new axillary buds were observed in a plot, the treatment for that plot was applied again and shoots greater than 3 cm in length were manually removed. For this reason, at Farm A, treatments 4, and 6 were applied three times; treatments 1, 2, 3, and 5 were applied twice; and treatment 7 was applied only once. And at Farm B, treatment 6 was applied three times; treatments 1, 2, 3, 4, and 5 were applied twice; and treatment 7 was applied only once.

TABLE 15

Axillary Shoot Length Results at Farm A

| Trt. No. | Treatment/ Date | Aug 6 D + 7 Days | Aug 14 D + 15 Days | Aug 20 D + 21 Days | Aug 26 D + 27 Days | Sept. 2 D + 34 Days | Sept. 10 D + 42 Days |
|---|---|---|---|---|---|---|---|
| 1 | Biosucker sprouting and 35 days | 0.1 To | 0.2 To | 0.3 To | 0.4 Ab | 0.8 Ab | 0.1 To |
| 2 | Biosucker sprouting and 35 days | 0.0 To | 0.1 To | 0.1 To | 0.2 To | 0.3 Ab | 0.0 To |
| 3 | Bioantak sprouting and 33-34 days | 0.1 To | 0.1 To | 0.2 To | 0.2 To | 0.6 Ab | 0.1 To |
| 4 | Bioantak sprouting, 33-34, and 55 days | 0.0 To | 0.0 To | 0.0 To | 0.1 To | 0.4 Ab | 0.1 To |
| 5 | FA + Pelargonic sprouting and 20-34 days | 0.1 To | 0.3 Ab | 0.5 To | 1.1 B | 2.5 C | 0.2 To |

TABLE 15-continued

Axillary Shoot Length Results at Farm A

| Trt. No. | Treatment/ Date | Aug 6 D + 7 Days | Aug 14 D + 15 Days | Aug 20 D + 21 Days | Aug 26 D + 27 Days | Sept. 2 D + 34 Days | Sept. 10 D + 42 Days |
|---|---|---|---|---|---|---|---|
| 6 | Fatty Alcohol sprouting, 14-15, and 33-34 days | 0.2 To | 0.7 B | 0.2 To | 0.5 Ab | 1.2 B | 0.4 B |
| 7 | FA + Pendimethalin sprouting | 0.0 To | 0.0 To | 0.0 To | 0.0 To | 0.0 To | 0.0 To |
| 8 | Untreated control | 1.6 B | 3.4 C | 4.7 B | 5.9 C | 6.0 D | 6.0 C |
| | Significance level | A. Sig. | A. Sig. | A. Sig. | A. Sig. | A. Sig. | A. Sig. |

| Trt. No. | Treatment/ Date | Sept. 16 D + 48 Days | Sept. 23 D + 55 Days | Sept. 29 D + 61 Days |
|---|---|---|---|---|
| 1 | Biosucker sprouting and 35 days | 0.3 Ab | 0.7 Ab | 1.0 B |
| 2 | Biosucker sprouting and 35 days | 0.1 To | 0.9 B | 1.1 Bc |
| 3 | Bioantak sprouting and 33-34 days | 0.5 B | 1.1 Bc | 1.7 C |
| 4 | Bioantak sprouting, 33-34, and 55 days | 0.4 Ab | 0.8 Ab | 0.1 To |
| 5 | FA + Pelargonic sprouting and 20-34 days | 0.5 Bc | 1.1 Bc | 1.7 Cd |
| 6 | Fatty Alcohol sprouting, 14-15, and 33-34 days | 0.9 C | 1.7 C | 2.2 D |
| 7 | FA + Pendimethalin sprouting | 0.1 To | 0.1 To | 0.3 To |
| 8 | Untreated control | 6.0 D | 6.0 D | 6.0 E |
| | Significance level | A. Sig. | A. Sig. | A. Sig. |

Treatments that differ in all their assigned letters are significantly different from the level of 5% or less The plants in the untreated control group at Farm A consistently produced larger shoots than the treated plants. At 7 days, the untreated plants had shoots of 3 to 15 cm in length. The shoots developed quickly, reaching an average length of 60 cm by day 35 of the study. This difference in shoot length of all treated and untreated plants was statistically significant through the length of the study. All treatments performed similarly up through day 21 of the study.

After day 34, the fatty alcohol treatment began to significantly underperform the standard treatment of fatty alcohol+pendimethalin. The pelargonic acid treatment maintained the same shoot length as the standard treatment until day 27. From day 27 to day 34 the standard treatment exceeded the pelargonic acid treatment. After applying the pelargonic acid a second time, the two performed similarly for short period before the standard treatment again began to outperform the pelargonic acid. With two applications, the Biosucker treatment performed statistically similar to the standard treatment until day 61. With two applications of the Bioantak treatment (treatment 3), shoot length was statistically similar to the standard treatment until day 48. With three applications (treatment 4), shoot length was statistically similar to the standard treatment through the length of the study.

The standard treatment of fatty alcohol+pendimethalin kept the shoots under 3 cm in length throughout the study at Farm A and up until day 41 at Farm B. The results of the Biosucker treatments were similar between the two farms in that a third application was not needed and the Biosucker successfully kept the shoots under 3 cm in length almost without exception. At both farms, the Bioantak treatment successfully kept shoots under 3 cm until day 48 of the study using two treatments, and until the end of the study when three treatments were used.

Regarding treatment with fatty alcohol and pelargonic acid (treatment 5) at Farm B, the second treatment was given correctly and the shoots did not exceed 3 cm in length until day 41. At Farm A, the shoots that received treatment 5 did not exceed 3 cm until day 55, but this is likely because the second treatment was given one week late. Therefore, based solely on Farm B, two applications of treatment 5 are understood to keep the shoots below 3 cm in length until between day 33 and 42.

TABLE 16

Axillary Shoot Length Results at Farm B

| Trt. No. | Treatment/Date | Aug 6 D + 6 Days | Aug 14 D + 14 Days | Aug 20 D + 20 Days | Aug 26 D + 26 Days | Sept. 2 D + 33 Days | Sept. 10 D + 41 Days | Sept. 16 D + 47 Days |
|---|---|---|---|---|---|---|---|---|
| 1 | Biosucker sprouting and 35 days | 0.0 To | 0.1 To | 0.2 Ab | 0.4 To | 0.8 Ab | 0.1 To | 0.9 To |
| 2 | Biosucker sprouting and 35 days | 0.1 To | 0.4 Ab | 0.6 Ab | 0.8 To | 1.5 B | 0.1 To | 0.2 To |
| 3 | Bioantak sprouting and 33 days | 0.1 To | 0.1 To | 0.1 Ab | 0.4 To | 0.8 Ab | 0.0 To | 0.7 To |
| 4 | Bioantak sprouting and 33 days | 0.0 To | 0.0 To | 0.0 To | 0.1 To | 0.5 Ab | 0.2 Ab | 0.6 To |
| 5 | FA + Pelargonic sprouting and 20 days | 0.1 To | 0.4 Ab | 0.7 B | 0.1 To | 0.4 To | 1.3 D | 2.5 B |
| 6 | Fatty Alcohol sprouting, 14, and 33 days | 0.0 To | 0.7 B | 0.0 To | 0.7 To | 1.4 Ab | 0.6 Bc | 1.1 Ab |
| 7 | FA + Pendimethalin sprouting | 0.0 To | 0.0 To | 0.1 Ab | 0.1 To | 0.5 To | 1.0 Cd | 1.2 Ab |
| 8 | Untreated control | 1.2 B | 2.7 C | 3.0 C | 4.4 B | 5.8 C | 6.0 E | 6.0 C |
| Significance level | | A. Sig. | A. Sig. | A. Sig. | A. Sig. | A. Sig. | A. Sig. | A. Sig. |

Treatments that differ in all their assigned letters are significantly different from the level of 5% or less The plants in the untreated control group at Farm B consistently produced larger shoots than the treated plants. At 7 days, the untreated plants had shoots of 3 to 15 cm in length. The shoots developed quickly, reaching an average length of 60 cm by day 41 of the study. This difference in shoot length of all treated and untreated plants was statistically significant through the length of the study. All treatments performed similarly up through day 33 of the study.

On day 41, the Biosucker and Bioantak treatments (treatments 1-4) resulted in significantly fewer shoots than the fatty alcohol treatment (treatment 6), the standard treatment (treatment 7) and the pelargonic acid treatment (treatment 5). On day 47, all treatments performed similarly to the standard, but the pelargonic acid treatment showed significantly longer shoots than the Biosucker and Bioantak treatments (treatments 1-4).

As for fatty alcohol treatments, a second treatment was required at day 14-15 and a third at day 33-34 after sprouting in order to keep outbreaks below 3 cm until between day 41 and day 48.

The effectiveness of each treatment method and each farm was calculated as compared to the non-treated control group. Table 17 below shows the results of the effectiveness calculation for Farm A and Table 18 shows the results for Farm B.

TABLE 17

| Farm A: Effectiveness Results | | | | | | | | | | |
|---|---|---|---|---|---|---|---|---|---|---|
| Trt. No. | Treatment/Date | Aug. 6 D + 7 Days | Aug. 14 D + 15 Days | Aug. 20 D + 21 Days | Aug. 26 D + 27 Days | Sept. 2 D + 34 Days | Sept. 10 D + 42 Days | Sept. 16 D + 48 Days | Sept. 23 D + 55 Days | Sept. 29 D + 61 Days |
| 1 | Biosucker at sprouting and 35 days | 97 | 93 | 94 | 93 | 88 | 99 | 96 | 88 | 83 |
| 2 | Biosucker at sprouting and 35 days | 99 | 98 | 99 | 97 | 95 | 99 | 98 | 85 | 81 |
| 3 | Bioantak at sprouting and 34 days | 97 | 97 | 96 | 96 | 90 | 99 | 92 | 82 | 73 |
| 4 | Bioantak at sprouting, 34, and 55 days | 99 | 100 | 99 | 99 | 94 | 99 | 94 | 88 | 99 |
| 5 | FA + Pelargonic at sprouting and 34 days | 91 | 92 | 90 | 82 | 59 | 97 | 91 | 81 | 72 |
| 6 | Fatty Alcohol at sprouting, 15, and 34 days | 86 | 80 | 96 | 92 | 80 | 93 | 85 | 73 | 63 |
| 7 | FA + Pendimethalin at sprouting | 100 | 100 | 100 | 100 | 100 | 99 | 99 | 98 | 96 |

TABLE 18

| Farm B: Effectiveness Results | | | | | | | | |
|---|---|---|---|---|---|---|---|---|
| Trt. No. | Treatment/Date | Aug. 6 D + 6 Days | Aug. 14 D + 14 Days | Aug. 20 D + 20 Days | Aug. 26 D + 26 Days | Sept. 2 D + 33 Days | Sept. 10 D + 41 Days | Sept. 16 D + 47 Days |
| 1 | Biosucker at sprouting and 35 days | 97 | 96 | 93 | 92 | 86 | 99 | 85 |
| 2 | Biosucker at sprouting and 35 days | 89 | 84 | 80 | 8 | 74 | 99 | 96 |
| 3 | Bioantak at sprouting and 33 days | 96 | 95 | 97 | 91 | 86 | 99 | 89 |
| 4 | Bioantak at sprouting and 33 days | 100 | 100 | 100 | 99 | 91 | 97 | 91 |
| 5 | FA + Pelargonic at sprouting and 20 days | 89 | 84 | 77 | 98 | 93 | 79 | 58 |
| 6 | Fatty Alcohol at sprouting, 14 and 33 days | 99 | 75 | 99 | 85 | 75 | 90 | 81 |
| 7 | FA + Pendimethalin | 99 | 99 | 98 | 98 | 92 | 83 | 80 |

The effectiveness of the Biosucker treatment was above 90% until between day 41 and day 48 of the study with two applications. For the Bioantak treatment, effectiveness was above 90% until day 47-48 with two applications and until day 61 with three applications. At Farm B, the fatty alcohol+ pelargonic acid treatments were less effective initially, but their effectiveness rose after the second application and remained above 90% until day 33. At Farm A, accounting from the delay in the second treatment, effectiveness could have been about 90% until day 34. Fatty alcohol treatments were above 90% effective until between day 20 and day 27 with two applications and until between day 41 and day 48 with three applications. The standard treatment (fatty alcohol+pendimethalin) resulted in an effectiveness above 90% until day 61 at Farm A and day 33 at Farm B. The difference in effectiveness between Farms A and B may be because, at Farm A the treatment was first applied when buds were observed and at Farm B the treatment was first applied at the flowering stage.

Only pelargonic acid caused phytotoxicity damage by burning leaves and axillary areas. In general, the damage was not as severe as in the study described in Example 3. Regarding outbreak control, all treatments had significantly higher control than the untreated control group.

A summary of the duration of the study each treatment effectively maintained shoot length below 3 cm in provided in Table 19 below.

TABLE 19

| Summer of Effective Period | | | | |
|---|---|---|---|---|
| Trt. No. | Treatment | Number of Applications | Farm A | Farm B |
| 1 and 2 | BIOSUCKER at sprouting and 35 days | 2 applications | 55 | 47 |
| 3 | BIOANTAK at sprouting and 33-34 days | 2 applications | 48 | 47 |

TABLE 19-continued

| Summer of Effective Period | | | | |
|---|---|---|---|---|
| Trt. No. | Treatment | Number of Applications | Farm A | Farm B |
| 4 | BIOANTAK at sprouting, 33-34 and 55 days | 3 applications | End | 47 |
| 5 | FA + PELARGONIC at sprouting and 20-34 days | 2 applications with 2 products | 42 | 33 |
| 6 | FATTY ALCOHOL at sprouting, 14-15, and 33-34 days | 3 applications | 48 | 41 |
| 7 | FA + PENDIMETHALIN at sprouting | 1 applications with 2 products | End | 33 |

What is claimed is:

1. A method of inhibiting axillary bud growth of a tobacco plant, comprising:

applying a composition comprising a citronellol as an active ingredient, and optionally further comprising another active ingredient chosen from one or more of decanol, pelargonic acid, pendimethalin, maleic hydrazide, butralin, and flumetralin, wherein the citronellol is organic and from a natural source, on the tobacco plant, and wherein the citronellol and optionally the another active ingredient are the only active ingredients in the composition for inhibiting axillary bud growth.

2. The method of claim 1, wherein the composition is chosen from an emulsion, a solution, and a mixture.

3. The method of claim 1, wherein the citronellol is present in a concentration up to about 10% (v/v) of the composition.

4. The method of claim 3, wherein the concentration of citronellol is from about 4% to about 6% (v/v) of the composition.

5. The method of claim 1, wherein the composition further comprises decanol.

6. The method of claim 1, wherein applying comprises contacting the composition to leaf axils of the tobacco plant by spraying the composition, using a drop line, or directing the composition on a stalk of the tobacco plant.

7. The method of claim 6, wherein spraying comprises using a pressure of about 0.5 bar to about 2.5 bar.

8. The method of claim 1, wherein the tobacco plant is in an elongated button stage of development.

9. The method of claim 1, wherein the tobacco plant comprises at least one axillary bud shoot with a length less than about 3 cm.

10. The method of claim 1, wherein the tobacco plant has a height from about 1.4 m to about 1.7 m.

11. The method of claim 1, further comprising topping the tobacco plant.

12. The method of claim 11, wherein the steps of applying and topping occur within a time period of 48 hours.

13. The method of claim 1, wherein the composition is applied in an amount from about 13 to 60 mL.

14. The method of claim 1, further comprising reapplying the composition to the tobacco plant about 4 to 7 days after the applying step.

15. The method of claim 1, further comprising reapplying the composition to the tobacco plant about 42 to 56 days after the applying step.

16. The method of claim 1, wherein, after applying the composition, new axillary bud growth is effectively inhibited for a suppression period of at least 5 days.

17. The method of claim 16, wherein the suppression period is at least 7 days, at least 14, or at least 21 days.

18. The method of claim 1, wherein the composition is an extraction product.

* * * * *